United States Patent
Zhou et al.

(10) Patent No.: US 7,303,339 B2
(45) Date of Patent: Dec. 4, 2007

(54) OPTICAL BEAM TRANSFORMER MODULE FOR LIGHT COUPLING BETWEEN A FIBER ARRAY AND A PHOTONIC CHIP AND THE METHOD OF MAKING THE SAME

(75) Inventors: Yan Zhou, Pleasanton, CA (US); Shide Cheng, Pleasanton, CA (US); Seng-Tiong Ho, Wheeling, IL (US)

(73) Assignee: Phosistor Technologies, Inc., Pleasanton, CA (US)

( * ) Notice: Subject to any disclaimer, the term of this patent is extended or adjusted under 35 U.S.C. 154(b) by 216 days.

(21) Appl. No.: 10/651,372

(22) Filed: Aug. 28, 2003

(65) Prior Publication Data
US 2004/0042729 A1 Mar. 4, 2004

Related U.S. Application Data

(60) Provisional application No. 60/406,723, filed on Aug. 28, 2002.

(51) Int. Cl.
  *G02B 6/42* (2006.01)
  *H04B 10/12* (2006.01)
(52) U.S. Cl. .................. 385/91; 398/141; 398/164
(58) Field of Classification Search .............. None
  See application file for complete search history.

(56) References Cited

U.S. PATENT DOCUMENTS

| | | | |
|---|---|---|---|
| 3,994,559 A | 11/1976 | Crow | |
| 4,152,044 A | 5/1979 | Liu | |
| 4,466,696 A | 8/1984 | Carney | |
| 4,639,074 A | 1/1987 | Murphy | |
| 4,640,585 A | 2/1987 | Nojiri | |
| 4,712,854 A | 12/1987 | Mikami et al. | |
| 4,839,553 A * | 6/1989 | Mellor | 313/111 |
| 4,859,492 A | 8/1989 | Rogers, Jr. et al. | |
| 4,919,504 A | 4/1990 | Colas et al. | |
| 4,930,854 A | 6/1990 | Albares et al. | |
| 5,046,808 A | 9/1991 | Chang | |
| 5,155,786 A | 10/1992 | Ecker et al. | |
| 5,217,749 A | 6/1993 | Denton et al. | |
| 5,243,677 A | 9/1993 | Kanamori et al. | |
| 5,259,049 A | 11/1993 | Bona et al. | |

(Continued)

OTHER PUBLICATIONS

Boyd, J.T.; Sriram, S. "Optical Coupling From Fibers to Channel Waveguides Formed on Silicon," *Applied Optics*, 1978, 17:6, 895-898.

(Continued)

*Primary Examiner*—Michelle Connelly-Cushwa
*Assistant Examiner*—Jerry T Rahll
(74) *Attorney, Agent, or Firm*—Brinks Hofer Gilson & Lione

(57) ABSTRACT

Optical modules and methods for making optical modules are described. In one embodiment, an optical module includes a substrate assembly including a photonic chip mounting region, and a groove extending towards the photonic chip mounting region. A waveguide is disposed within the groove. A plurality of spacers is on the chip mounting region, each spacer having a predetermined height. A photonic chip is placed on the plurality of spacers and above the chip mounting region, and an optical coupler is between the photonic chip and the waveguide.

9 Claims, 16 Drawing Sheets

U.S. PATENT DOCUMENTS

| | | | |
|---|---|---|---|
| 5,276,693 A | | 1/1994 | Long et al. |
| 5,294,288 A | * | 3/1994 | Melpolder et al. ........ 427/163.1 |
| 5,337,398 A | | 8/1994 | Benzoni et al. |
| 5,357,593 A | | 10/1994 | Bossler |
| 5,444,805 A | | 8/1995 | Mayer |
| 5,499,309 A | | 3/1996 | Kozuka et al. |
| 5,515,464 A | | 5/1996 | Sheem |
| 5,552,092 A | | 9/1996 | Francis et al. |
| 5,675,684 A | * | 10/1997 | Hirataka et al. .............. 385/88 |
| 5,689,374 A | | 11/1997 | Xu et al. |
| 5,703,895 A | | 12/1997 | Ghirardi et al. |
| 5,719,973 A | | 2/1998 | Monroe et al. |
| 5,787,214 A | | 7/1998 | Harpin et al. |
| 5,792,674 A | | 8/1998 | Kitamura |
| 5,881,190 A | | 3/1999 | Harpin et al. |
| 5,907,649 A | | 5/1999 | Acklin et al. |
| 5,930,423 A | | 7/1999 | Chen et al. |
| 5,932,397 A | | 8/1999 | Mustacich |
| 5,937,124 A | | 8/1999 | Roff |
| 6,052,397 A | | 4/2000 | Jeon et al. |
| 6,112,001 A | | 8/2000 | Kishida et al. |
| 6,118,915 A | | 9/2000 | Sato |
| 6,151,430 A | | 11/2000 | Traver, Jr. et al. |
| 6,157,765 A | | 12/2000 | Bruce et al. |
| 6,181,722 B1 | | 1/2001 | Dütting et al. |
| 6,229,947 B1 | | 5/2001 | Vawter et al. |
| 6,240,233 B1 | | 5/2001 | Weinert et al. |
| 6,257,770 B1 | | 7/2001 | Sato |
| 6,310,995 B1 | | 10/2001 | Saini et al. |
| 6,324,323 B1 | | 11/2001 | Benham et al. |
| 6,324,326 B1 | | 11/2001 | Dejneka et al. |
| 6,330,378 B1 | | 12/2001 | Forrest et al. |
| 6,339,667 B1 | | 1/2002 | Song et al. |
| 6,345,138 B1 | | 2/2002 | Kawai et al. |
| 6,396,984 B1 | | 5/2002 | Cho et al. |
| 6,456,761 B2 | * | 9/2002 | Yap et al. ..................... 385/33 |
| 6,631,225 B2 | | 10/2003 | Lee et al. |
| 6,690,871 B2 | | 2/2004 | Lee et al. |
| 6,697,551 B2 | | 2/2004 | Lee et al. |
| 6,724,968 B2 | | 4/2004 | Lackritz et al. |
| 6,775,453 B1 | | 8/2004 | Hornbeck et al. |
| 6,798,960 B2 | | 9/2004 | Hamada |
| 6,879,757 B1 | | 4/2005 | Zhou et al. |
| 6,888,989 B1 | | 5/2005 | Zhou et al. |
| 2002/0004253 A1 | | 1/2002 | Ooi et al. |
| 2002/0048727 A1 | | 4/2002 | Zhou et al. |
| 2003/0007746 A1 | | 1/2003 | Ryu et al. |
| 2003/0031443 A1 | | 2/2003 | Soljacic et al. |
| 2003/0044118 A1 | | 3/2003 | Zhou et al. |
| 2003/0053756 A1 | | 3/2003 | Lam et al. |
| 2003/0118310 A1 | | 6/2003 | Steinberg et al. |
| 2003/0215187 A1 | | 11/2003 | Tidmarsh et al. |
| 2005/0036738 A1 | | 2/2005 | Zhou et al. |
| 2006/0062521 A1 | | 3/2006 | Zhou et al. |

OTHER PUBLICATIONS

Choi, M.H.; Koh, H.J.; Yoon, E. S.; Shin, K.C.; Song, K.C. "Self-Aligning Silicon Groove Technology Platform for the Low Cost Optical Module," *Electronic Components and Technology Conference*, 1999, 1140-1144.

Duataras, M.F.; Fisher, J.; Luo, H.; Datta, P.; Jeantilus, A. "Hybrid Optical Packaging, Challenges and Opportunities," *2002 Electronic Components and Technology Conference*, 2002, 787-793.

Jang, S. "Automation Manufacturing Systems Technology for Optoelectronic Device Packaging," *2000 Electronic Components and Technology Conference*, 2000, 10-14.

Kurata, K. "Mass Production Techniques for Optical Modules," 1998 *Electronic Components and Technology Conference*, 1998, 572-580.

Mueller, P.; Vaulk, B. "Automated Fiber Attachment for 980nm Pump Modules," *2000 Electronic Components and Technology Conference*, 2000, 5-9.

* cited by examiner

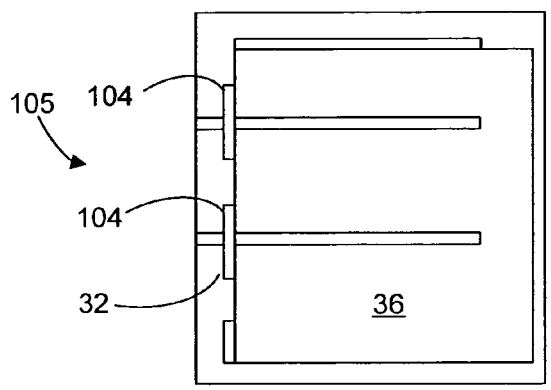
FIG. 1 (G)
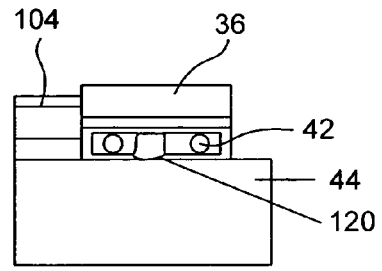
FIG. 1 (H)
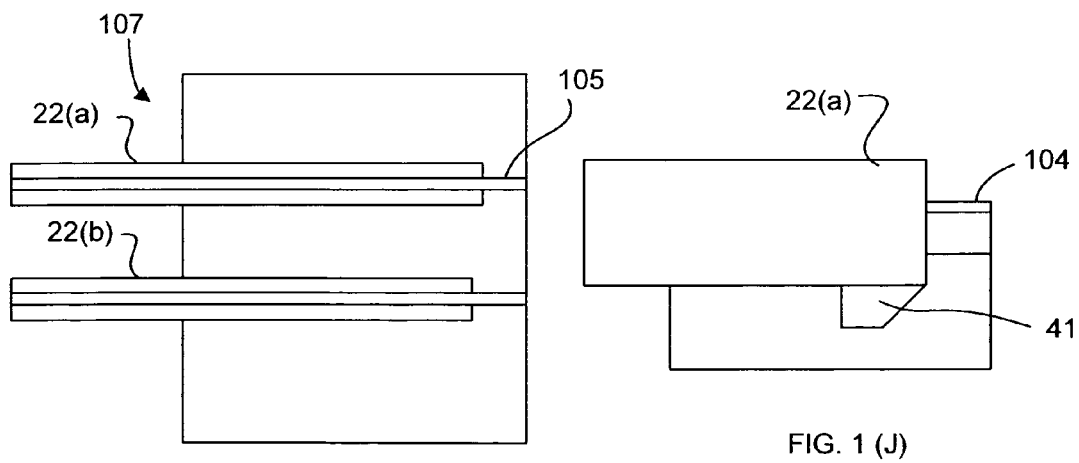
FIG. 1 (I)
FIG. 1 (J)

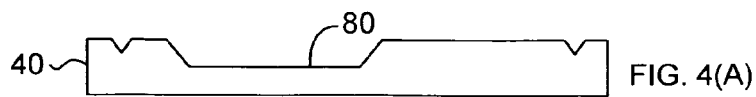
FIG. 4(A)
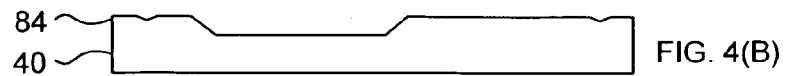
FIG. 4(B)
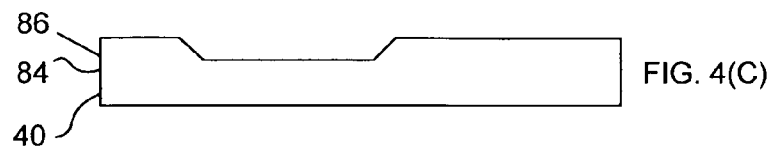
FIG. 4(C)
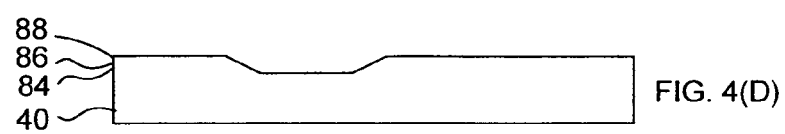
FIG. 4(D)
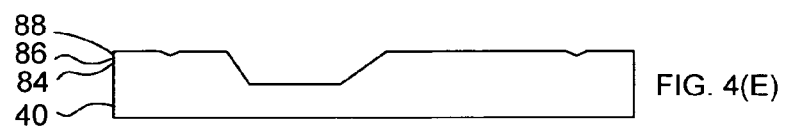
FIG. 4(E)
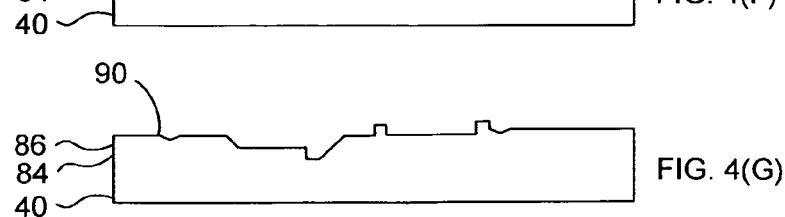
FIG. 4(F)
FIG. 4(G)
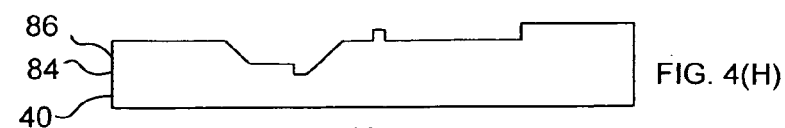
FIG. 4(H)
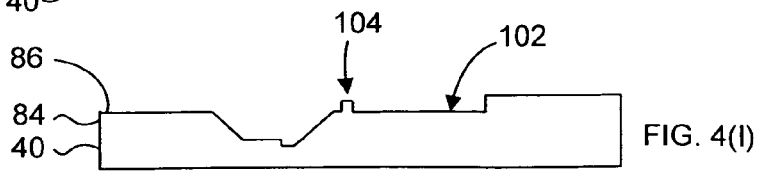
FIG. 4(I)

OPTICAL BEAM TRANSFORMER MODULE FOR LIGHT COUPLING BETWEEN A FIBER ARRAY AND A PHOTONIC CHIP AND THE METHOD OF MAKING THE SAME

This application claims the benefit of the filing date under 35 U.S.C. § 119(e) of Provisional U.S. Patent Application Ser. No. 60/406,723, filed on Aug. 28, 2002, which is hereby incorporated by reference in its entirety.

CROSS REFERENCES TO RELATED APPLICATIONS

This application is related to co-pending U.S. patent application Ser. No. 10/056,430, entitled "Connection of a Waveguide Fiber Coupler with an Optical Fiber and a Photonic Integrated Chip," filed Oct. 22, 2001.

This application is also related to co-pending U.S. patent application Ser. No. 10/083,674, entitled "Integrated Planar Composite Coupling Structures for Bi directional Light Beam Transformation Between a Small Mode Size Waveguide and a Large Mode Size Waveguide," filed Oct. 22, 2001.

This application is also related to co-pending U.S. patent application Ser. No. 10/310,330, entitled "Connection Between a Waveguide Array and a Fiber Array," filed Dec. 4, 2002.

This application is also related to co-pending U.S. patent application Ser. No. 10/310,604, entitled "Photonic Chip Mounting in a Recess for Waveguide Alignment and Connection," filed Dec. 4, 2002.

This application is also related to co-pending U.S. patent application Ser. No. 10/652,269, entitled "Varying Refractive Index Optical Medium Using At Least Two Materials With Thicknesses Less Than A Wavelength", filed concurrently.

All of the patents, patent applications, and references in this patent application (including those above) are incorporated by reference in their entirety for all purposes.

BACKGROUND OF THE INVENTION

Currently, photonic integration is a topic of interest because optical subsystems made from discrete optical components that are interconnected and packaged with fiber pigtails are large and expensive. Photonic integration will make it possible to drastically reduce the cost and also the size of such subsystems. This is because, based on the concept of planar parallel processing as has happened to microelectronics integrated circuits (ICs), many optical components can be fabricated at the same time. Also, since optical waveguide based photonic components are smaller as compared to free space based optical components, the component density in a photonic integrated optical module is high. Photonic integration can also enable easy short distance interconnection among the different optical components fabricated on the same substrate. This reduces the size of a subsystem as well as the packaging cost which would otherwise be needed for each optical component.

However, photonic integration also brings new challenges. For example, the beam in a standard single mode optical fiber is circular and has a diameter of about 10 micrometers. The beam of a standard III–V compound semiconductor based single mode waveguide is elliptical and has a typical size of about 1 micrometers by 4 micrometers. Beam size transformation and sub micron accuracy alignment between the fiber and the III–V semiconductor waveguide are needed when fabricating photonically integrated optical modules. Also, to take full advantage of photonic chips, which can have multiple optical inputs and outputs, simultaneous beam size transformation and the use of multiple grooves for multiple fibers are preferred.

In the past, optical beam size transformation is achieved by either fabricating a beam spot size converter directly on the III–V semiconductor material next to the single mode waveguide, and then butt-connecting an optical fiber to the beam spot size converter. Alternatively, a separate lens such as a glass ball lens, or a lens tipped fiber may be used to achieve alignment and relatively high coupling efficiency.

Improvements could be made to these approaches. III–V semiconductor based beam spot size converters are expensive, because III–V semiconductor materials such as InP are expensive (as compared to, for example, Si or $SiO_2$). As for the ball lens or lens tipped fiber approach, light beam focusing is in air, which has a refractive index of one. The focused beam spot size cannot be smaller than the light wavelength of interest ($\lambda=1.5$ micrometers for the most popular optical fiber communication wavelength window) due to the physical light wave diffraction limit. Hence, the maximum coupling efficiency that can be achieved is only about 80%. In addition, this approach cannot be easily extended to the case where multiple input and output ports are used. In this case, each fiber needs to be aligned with each semiconductor waveguide. If one alignment fails, the whole module will not function properly.

An improvement over the above approaches is to fabricate a micro optical bench using silicon based micro-fabrication technology. However, conventional approaches using such techniques are basically designed for light beam free space connections and they do not include optical waveguide based beam size transformation couplers fabricated together with grooves and photonic chip pockets. Also, in such conventional apparatuses, active alignment is still commonly practiced, as the positioning accuracy of the photonic chips is not suitable for sub micron requirements.

Embodiments of the invention address these and other problems.

BRIEF SUMMARY OF THE INVENTION

Embodiments of the present invention provide a device platform to Auto-align photonic chips with other photonic chips, optical components or optical fibers with high placement accuracy. The device platform comprises one or more optical couplers to focus or collimate light from one optical element to another. The device platform allows one or more inputs and/or outputs from each photonic chip to communicate with multiple optical components, chips, or fibers. The device fabrication methods described herein are similar to those that are used in fabricating Si based planar integrated circuits and hence allows for mass production at low cost.

One aspect of the invention is an optical module comprising (a) a substrate assembly including (i) a photonic chip mounting region, and (ii) a groove extending towards the photonic chip mounting region. The optical module also comprises (b) a waveguide disposed within the groove, (c) a plurality of spacers on the chip mounting region, each spacer having a predetermined height, (d) a photonic chip on the plurality of spacers and above the chip mounting region; and (e) an optical coupler between the photonic chip and the waveguide.

Another aspect of the invention is a method for making an optical module. The method comprises (a) forming a groove in a substrate, (b) providing an optical coupler on the substrate, (c) providing a plurality of spacers on the photonic chip mounting region, (d) placing a photonic chip on the spacers and above the photonic chip mounting region, and (e) providing a waveguide in the groove.

Another aspect of the invention is an optical module comprising (a) a substrate assembly including (i) a photonic chip mounting region, and (ii) a groove extending towards the photonic chip mounting region. The module also comprises (b) a waveguide disposed within the groove, (c) a photonic chip mounted on the photonic chip mounting region, and (d) an optical coupler between the photonic chip and the waveguide, wherein the optical coupler includes a plurality of materials having different indices of refraction.

Another aspect of the invention is a method for forming an optical module, the method comprising (a) forming an optical coupler on a substrate, (b) forming a wall portion on the substrate, wherein the optical couple and the wall portion at least partially define a chip mounting region and a pocket, and (c) mounting the photonic chip on the chip mounting region.

Another aspect of the invention is an optical module, the module An optical module comprising (a) a substrate assembly including (i) a photonic chip mounting region, (ii) a pocket at least partially defined by the photonic chip mounting region and a wall portion, and (iii) a groove extending towards the photonic chip mounting region. The optical module also comprises (b) a waveguide disposed within the groove, (c) a photonic chip comprising an island having an abutment wall, the photonic chip being above the chip mounting region, wherein the abutment wall contacts the wall portion, and (d) an optical coupler between the photonic chip and the waveguide.

Another aspect of the is an optical module comprising (a) a substrate assembly including a plurality of grooves, (b) a plurality of optical waveguides in the grooves, and (c) a plurality of optical couplers, wherein the plurality of optical couplers form part of the substrate assembly.

In one aspect of the present invention, an optical module contains one or more arrays of optical couplers together with one or more arrays of fiber or optical element positioning grooves, and one or more photonic chip pockets. These are fabricated using photolithography and planar fabrication techniques, thereby allowing mass production and high alignment accuracy.

In another aspect of the present invention, a natural etch stop interface between a coupler material and a silicon substrate is used with spacers of very precise dimensions (e.g., variation is smaller than about 0.1 μm) to define the vertical position of a mounted photonic chip to high accuracy.

In yet another aspect of the present invention, these precision spacers are placed in a pocket. The spacers and a pre selected solder pad area provide precise vertical chip alignment independent of the joining material connecting and holding the chip to the substrate. In one embodiment of the present invention, the spacers are spherical balls with very precise diameters. The frictional forces between the photonic chip and the spacers are low so that alignment of the photonic chip can be achieved with a low positioning force. In yet another aspect of the present invention, lateral or horizontal abutment structures are used as self stoppers to align the photonic chip laterally and/or horizontally.

In still another aspect of the present invention, a bottom solder pad on a substrate and a top solder pad on a photonic chip are offset. These offset pads are used together with molten solder between the offset pads so that the surface tension of the solder can cause the solder to pull the photonic chip towards the bottom solder pad (e.g., downwards as well as sideways), thereby achieving auto alignment. In one embodiment of the present invention, the solder is used to form a mechanical or electrical connection between the photonic chip and the underlying substrate.

In still another aspect of the present invention, the photonic chip is self aligned to an optical coupler (the optical coupler may be an optical mode transformer structure). In one embodiment of the present invention, the optical coupler comprises multilayer films with varying refractive indices.

In still another aspect of the present invention, the grooves for optical fibers are used to auto align the fiber or optical element to the optical coupler. In one embodiment of the present invention, the grooves are V-shaped or U-shaped, and are fabricated using dry or wet etching or precision machining.

In still another aspect of the present invention, the optical beam from the photonic chip is optically coupled to or from an optical element, optical fiber or another photonic chip through the optical coupler.

Other features of embodiments of the present invention are described below.

BRIEF DESCRIPTION OF THE DRAWINGS

FIGS. 4(a)–4(i) show the steps used to deposit the glass film for the coupler, to pattern and dry etch the optical coupler structure as well as the photonic chip pocket (with precision mechanical stoppers).

DETAILED DESCRIPTION

Figure 1:
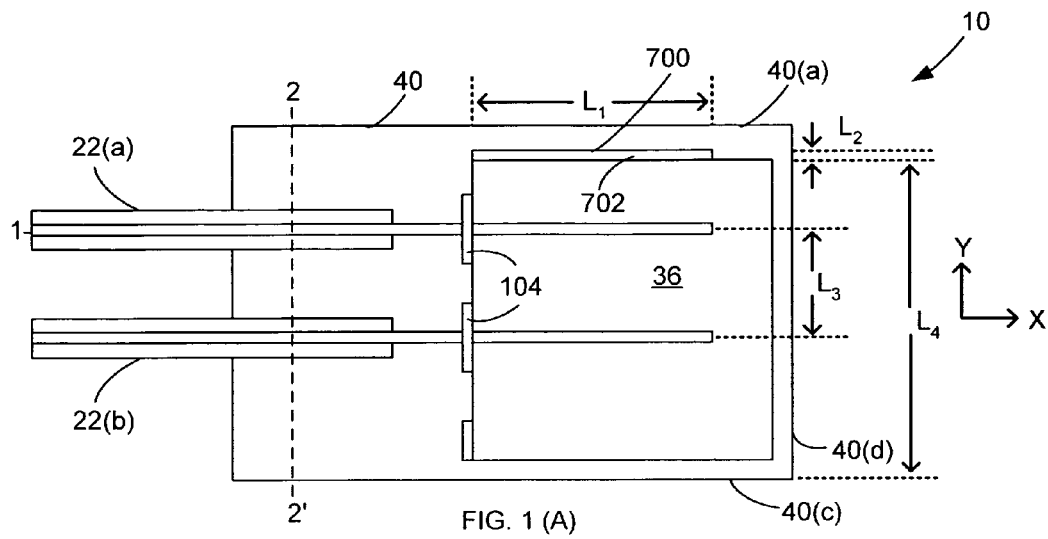
FIG. 1(a) shows a top view of an optical module made on a silicon substrate together with optical fibers, and a photonic chip.
FIG. 1(b) is a cross sectional view of the optical module in FIG. 1(a) alone the line 1–1'.
FIG. 1(c) shows a cross sectional view of the optical module in FIG. 1(a) along the line 2–2'.
FIG. 1(d) shows an optical module with two photonic chips.
FIG. 1(e) shows an optical module with two photonic chips and optical elements between the two photonic chips.
FIG. 1(f) shows an optical module with a photonic chip with optical fibers on opposite sides of the photonic chip.
FIGS. 1(g) and 1(h) show an optical module with a photonic chip and optical couplers.
FIGS. 1(i) and 1(j) show an optical module with a plurality of optical fibers and optical couplers.
Figure 1:
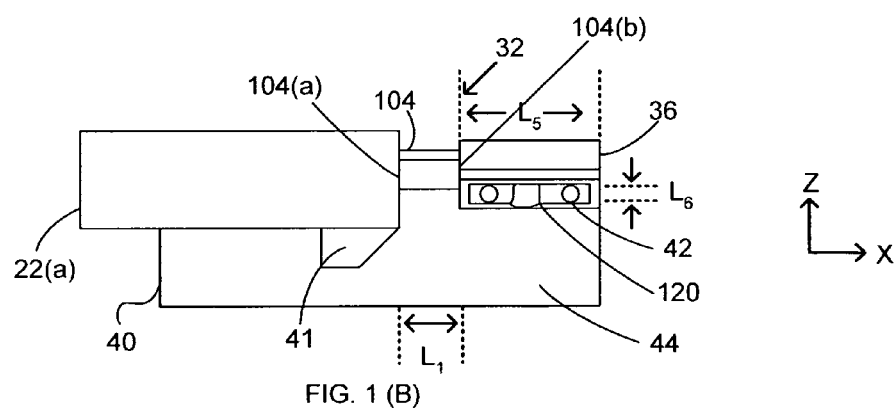
Figure 1:
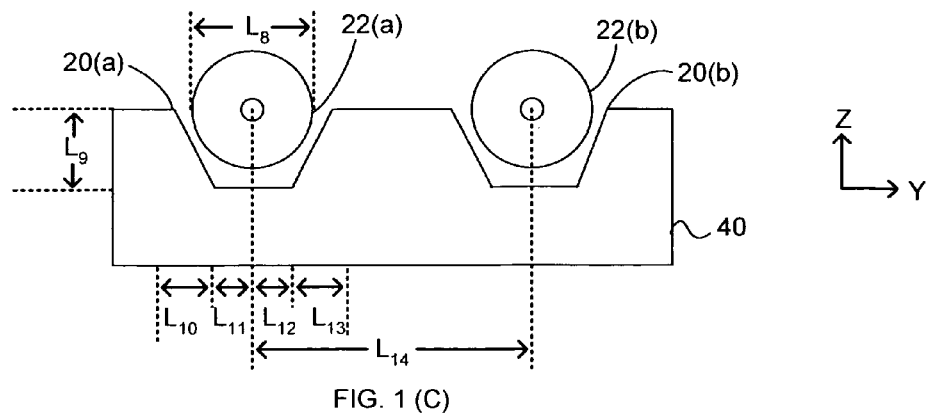
Figure 1:
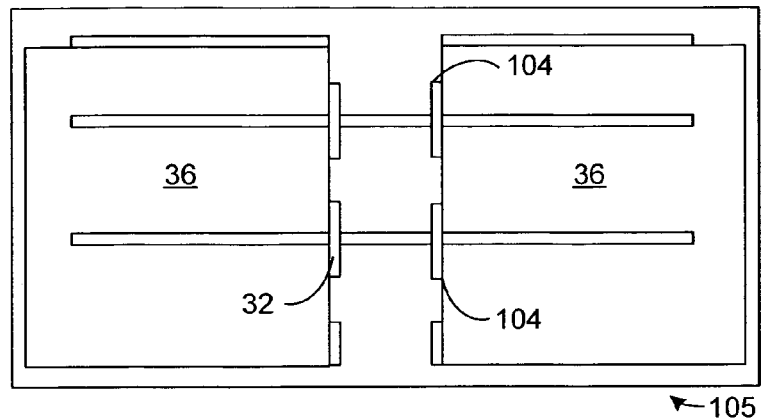
Figure 1:
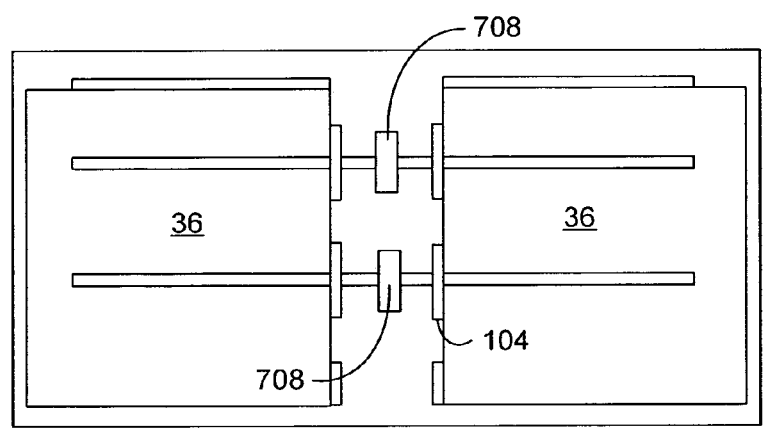
Figure 1:
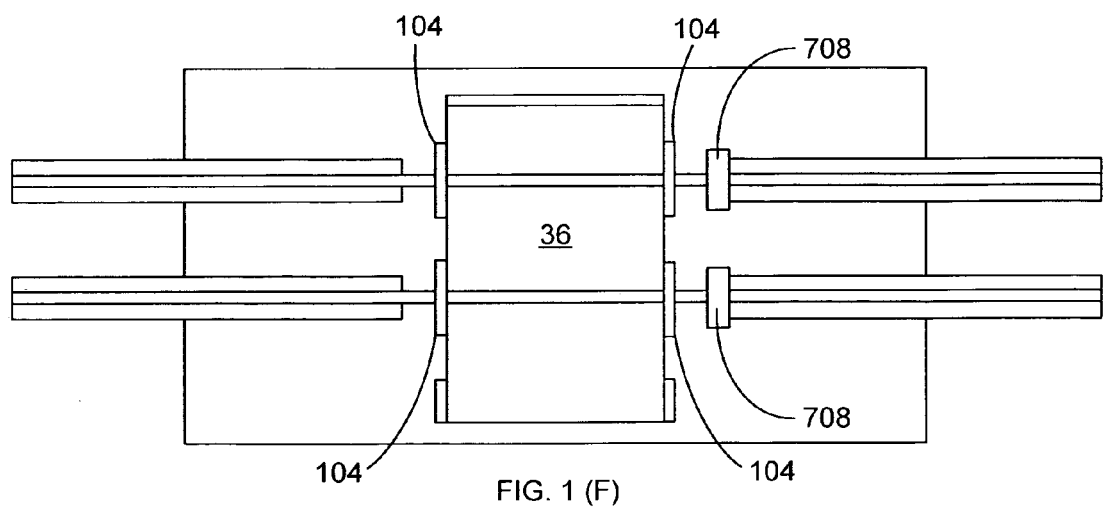

Embodiments of the present invention provide a device platform to auto-align photonic chips with other photonic chips, optical elements, or optical fibers with high placement accuracy. The device platform comprises one or more optical couplers to focus or collimate light from one optical component to another. One or more inputs and/or outputs from each photonic chip can be in communication with multiple optical elements, optical chips, or fibers. The device fabrication methods described herein are similar to those used in fabricating silicon based planar integrated circuit and hence allows for mass production at low cost. Embodiments of the invention also relate to the processing steps for fabricating an optical coupler together with one or more fiber positioning grooves and a photonic chip pocket. In embodiments of the invention, the alignment of the photonic chip, the coupler, and an optical fiber is easier and more accurate than in conventional processes.

Described herein are various exemplary processes and embodiments of the present invention. To be consistent throughout the present specification and for clear understanding of the present invention, the following background and terminological definitions are hereby provided for terms used therein.

"Photonic chip" includes any optical waveguide containing chip and such a chip may have one or more channel waveguides with passive and/or active devices. "Passive components" are those that can manipulate a light beam without an external power supply and they include a channel waveguide, directional coupler, interferometer, power splitter/combiner, polarizer, polarization rotator, polarization splitter/combiner, filter, mirror, saturable absorber, attenuator, photonic crystal based component, optical waveguide isolator, and arranged waveguide grating (AWG) multiplexer/demultiplexer. "Active components" are those that need external power supply to manipulate a light beam and they include light source, laser, amplifier, tunable attenuator, amplitude and/or phase modulator, detector, tunable filter, and pulse cleaner.

These components can be made on Group II–VI, III–V compound semiconductors such as GaAs and InP, silicon, glass, quartz, or optical crystals such as $LiNbO_3$, and $BaTiO_3$. An "optical coupler" can refer to any structure that can transform a light beam from one optical element to another by reshaping the profile of the light beam's intensity and/or phase. Examples of optical couplers include a glass ball lens, glass GRIN lens, tapered waveguide structure, multilayered lens, a curved surface and phase modulated surface such as DOE (diffractive optical element), and Fresnel zone plate based lens. "Optical elements" include passive or active components, and means all kinds of optical devices that perform various optical beam manipulation functions. They may be miniaturized versions of bulk optical elements or fiber optics versions offering similar functions. They include an optical isolator, beam splitter/combiner, polarizer, polarization beam splitter/combiner, thin film filter, attenuator, waveplate, retarder, polarization rotator, prism and optical switch. "Optical fiber" includes single mode or multimode fibers, tensed or wedged fibers, and glass and plastic fibers. It is understood that the above noted terms need not be exclusive of each other. For example, an active component could form part of a photonic chip in some embodiments.

The photonic chip, and optical element or fiber interconnecting device platform, according to embodiments of the present invention are described in further detail below. Various devices will be described with respect to transmission of a single light beam with wavelength $\lambda$. It should be understood that the terms light beam, optical beam, laser beam, etc., are used interchangeably. Moreover, while descriptions of embodiments of the invention refer to a single light beam, there may be more than one light beam propagating in the optical module, the light beams may be made up of light with many wavelengths, may be continuous wave light or pulsed light, or may have various beam sizes. Thus, the nature of the light beam is used only for illustrative purposes and is not meant to limit the scope of the invention.

Unless otherwise stated, the exemplary dimensions will be specified with respect to an exemplary optical wavelength of 1.5 µm. Those skilled in the art will know that the exemplary dimensions will scale proportionally to the wavelength used which can range from ultra violet (e.g., on the order of 0.1 µm) to far infrared (e.g., on the order of 10 µm).

The various device embodiments described herein are useful for transforming the mode size of an input beam having a dimension on the order of from about 0.2 µm or even less to a beam dimension on the order of about 10 µm to 50 µm or more, and vice versa, with appropriate changes to the various parameters disclosed. Thus one skilled in the art should understand that the various embodiment parameters (e.g., length and width dimensions) disclosed herein are exemplary and may be varied according to the desired application.

I. Interconnecting Device Platforms Including Optical Modules

A. Exemplary Overall Structure of the Opical Module

FIGS. 1(a) 1(c) show an exemplary optical module 10 according to an embodiment of the invention. It includes optical fibers 22(a), 22(b), a photonic chip 36, and optical couplers 104 between the optical fibers 22(a), 22(b) and the photonic chip 36. The optical fibers 22(a), 22(b), the photonic chip 36, and the optical couplers 104 are on a substrate 40. The substrate 40 may be, for example, a silicon or glass wafer or a portion of a silicon or glass wafer. The optical fibers 22(a), 22(b), the couplers 104, and the photonic chip 36 are aligned and fixed in the optical module.

The photonic chip 36 may comprise a III V compound semiconductor material such as InP or GaAlAs. The photonic chip 36 may include active components, including but not limited to, lasers, amplifiers, modulators, detectors. The chip may also or alternatively include passive components, including, but not limited to, transparent waveguides, beam splitters/combiners, and polarization controllers.

The substrate 40 may comprise any suitable material and may be in any suitable configuration. For example, the substrate 40 may comprise a semiconductor such as a silicon substrate (e.g., Si(100)) or a glass or ceramic substrate. The substrate 40 may include one or more distinct layers of material.

The substrate 40 may also form part of a substrate assembly. The substrate assembly may simply be the substrate in some embodiments. In other embodiments, the substrate assembly may include a substrate and any layers or structures formed on the substrate. Such layers may form one or more wall portions that form a chip pocket, sidewall protection layers, passivation layers, bonding pads, optical couplers, circuit lines, and grooves (e.g., V or U-grooves) for waveguides or optical fibers.

Optical fibers 22(a), 22(b) are examples of waveguides that can be provided with grooves on the substrate 40. In other embodiments, it is possible to form waveguides on the substrate 40 rather than place preformed waveguides on the substrate 40. The optical fibers 22(a), 22(b) may have any suitable diameter (e.g., about 125 micrometers).

The optical couplers 104 each have a large beam end face 104(a) and a small beam end face 104(b). In this example, for each optical coupler 104, the large beam end face 104(a) of each optical coupler 104 is proximate its corresponding fiber 22(a), 22(b) and the small beam end face 104(b) is proximate the photonic chip 36. Preferably, as will be described in further detail below, the optical couplers 104 are formed on the substrate 40. However, in other embodiments of the invention, the optical couplers 104 could be pre formed and then placed on the substrate 40.

Referring to FIGS. 1(a) and 1(c), two single mode fibers 22(a), 22(b) are positioned in two U-grooves 20(a), 20(b). Alternatively, the U-grooves 20(a), 20(b) could be V-grooves, or grooves with any other cross sectional shape. The fibers 22(a), 22(b) are positioned so that they are almost in contact with the support sidewalls of the U-grooves 20(a), 20(b). The cores of the fibers 22(a), 22(b) are aligned with the large beam end faces 104(a) of their respective optical couplers 104.

In some embodiments, there could be tiny gaps (not shown) between the end faces of the optical fibers 22(a), 22(b) and the large beam end faces 104(a) of the optical couplers 104. These gaps could be filled with an index matching fluid or oil or gel material to reduce reflection from the interfaces between materials having different refractive indices.

At the small beam end faces 104(b) of the optical couplers 104, tiny gaps 32 (of the order of about 1 μm) can be created to avoid direct contact with the waveguide end face of the photonic chip 36 and the optical coupler 104. This mechanically protects the waveguide end face of the photonic chip 36. Anti-reflection coatings could also be deposited on the facing end faces of the photonic chip 36 and the optical coupler 104 to reduce reflection.

B. Exemplary Description of the Alignment of the Optical Module

As shown in FIG. 1(b), the photonic chip 36 is coupled to the substrate 40 through a solder bump 120. The solder bump 120 can comprise a solder alloy (e.g., a Pb Sn alloy) that has been reflowed. In this example, the photonic chip 36 as shown in FIG. 1(a) is pushed to the upper left corner of a pocket formed by different wall portions 40(a)–40(c), the optical couplers 104, and the upper surface of the substrate 40. One or more wall portions 40(a)–40(c) and one or more optical couplers 104 could form a single, unitary structure in some embodiments. The pocket that is formed may be configured to receive the photonic chip 36. It may be defined at least in part by one or more wall portions that may be contiguous or non contiguous.

Referring to the longitudinal cross section view (1–1') shown in FIG. 1(b), from the left side to the right side, a fiber 22(a) is positioned in a U-groove created using a KOH based crystallographic wet etching process (or any other suitable etch or machining process). Wet etching will also create an inclined end face at the end of the U-groove. A dry Si deep etch is performed at the U-groove end region to make a trench 41 next to the optical coupler 104 so that the fiber 22(a) can be positioned very close to the optical coupler large beam side end face 104(a).

The photonic chip 36 rests on glass ball spacers 42 and a solder bump 120. A solder pad at the bottom of the photonic chip 36 is electrically or mechanically coupled to a bottom solder pad on the substrate 40 through the solder bump 120. The solder bump connection can serve two purposes. The first one is to enable an electrical connection that could be channeled to the outside of the optical module. The second one is to act independently as a mechanical connection and also as a thermal conduction path without serving any electrical connection task.

The glass ball spacers define and maintain the vertical position of the photonic chip even when the solder bump 120 deforms during the reflow process. Although balls or spheres are preferred, spacers such as cylinders, cubes, etc. could be used instead of or in addition to spheres. The spacers can have a melting temperature greater than the solder bump 120.

As shown in FIG. 1(b), there may be an intentional offset between the bottom solder pad on the substrate 40 and the top solder pad on the photonic chip 36. For example, the bottom solder pad on the substrate surface may be closer to the wall portion 40(a) and the optical coupler 104 than the top solder pad on the photonic chip 36. During reflow, the photonic chip 36 is pulled down and sideways towards the small beam side end face 104(b) of the optical coupler 104 and towards the wall portion 40(a) so that it self aligns with respect to the optical coupler 104. The surface tension of the solder alloy causes the movement of the photonic chip 36.

As will be described in more detail below, the photonic chip 36 may have an island formed at its bottom surface. A sidewall of the island abuts against a face 700 of wall portion 40(a). A portion 702 of the photonic chip 36 overhangs part of the wall portion 40(a). Photonic chips with islands are described in further detail below.

The locational offset of the solder pads allows the photonic chip 36 to self-align with the optical couplers 104 and the fibers 22(a), 22(b). However, a locational offset is not required in all embodiments. For example, a well-aligned pair of solder pads should enable the photonic chip 36 to align to the coupler 104 with a precision of about 1 μm. In addition, if the photonic chip 36 has both input and output ports on both the left and the right sides of the photonic chip 36, then it is desirable to make the pocket slightly wider than photonic chip 36. In this case, there is no need to push the photonic chip 36 to either the left or the right as otherwise, it will create a gap on the other side of the photonic chip 36.

The void space between the photonic chip 36 and the Si surface of the substrate 40 can be filled with an underfill or encapsulation material 44. The underfill or encapsulation material 44 can be of a type that is commonly used in flip chip bonding to increase the reliability of the assembly, such as epoxy and ceramic filler material. Referring to the lateral cross section (2–2') view of the assembly, the fibers 22(a), 22(b) are positioned in the U-grooves 20(a), 20(b). Due to the precision of the KOH based wet etching process used to form the U-grooves 20(a), 20(b) and also the selection of the fibers 22(a), 22(b) with precise dimensions, the locations of the cores of the fibers 22(a), 22(b) with respect to the silicon substrate 40 can be very precise (e.g., to a precision of about 1 µm). The depth of each U-groove 20(a), 20(b) can be controlled by the KOH wet etching time and temperature. In this example, each fiber 22(a), 22(b) is mechanically supported by the two sidewalls of its respective U-groove 20(a), 20(b). As shown in FIG. 1(c), a space may be between the bottom of each groove 20(a), 20(b) and its corresponding fiber 22(a), 22(b). A smaller volume of space may be below each fiber 22(a), 22(b) in some embodiments. This can be beneficial as it reduces thermal expansion differences which may cause movement of the fibers 22(a), 22(b).

C. Exemplary Dimension of the Optical Module

The components of the module may have any suitable dimensions. For example, in one embodiment, exemplary dimensions, as shown in FIG. 1(a) to (c) may be: $L_1$=1000 µm, $L_2$=10 µm, $L_3$=250 µm, $L_4$=500 µm, $L_5$=1000 µm, $L_6$=5 µm, $L_7$=50 µm, $L_8$=125 µm, $L_9$=70 µm, $L_{10}$=50 µm, $L_{11}$=20 µm, $L_{12}$=20 µm, $L_{13}$=50 µm, and $L_{14}$=250 µm.

D. Other Exemplary Variations of the Optical Module

It should be understood that since the coupler serves the function of focusing or collimating a light beam and the auto alignment platform can be used to position photonic chips, or miniaturized optical elements or optical fibers, the interconnection device platform can hence be used to interconnect different optical entities in various ways. Some alternative examples are shown in FIGS. 1(d) to 1(j), where like elements are designated by like numerals.

As shown in FIG. 1(d), two photonic chips 36 can be interconnected via an array 105 of optical couplers 104. The optical couplers 104 may form part of a substrate assembly and may be between input and/or output ports of the two photonic chips 36. The photonic chips 36 can be mounted on photonic chip mounting regions that are defined by at least one wall portion.

As shown in FIG. 1(e), some miniaturized optical elements 708 (described above) can be positioned in between the two photonic chips 36. The optical elements 708 and the optical couplers 104 may be between the input and/or output ports of the photonic chips 36. Although two photonic chips are shown in the embodiments in FIGS. 1(d) and 1(e), it is understood that the number of interconnected photonic chips can be more than two.

In another embodiment, as shown in FIG. 1(f), a photonic chip 36 may have both input and output ports at opposite sides of the photonic chip 36. The optical module may include optical coupler structures 104 and grooves that are formed as part of a substrate assembly. Optical fibers 22(a), 22(d) are in the grooves and communicate with the chip 36. Optical elements 708 (such as those described (above)) may be in the optical paths formed by the fibers 22(c), 22(d) as shown in FIG. 1(f).

In yet another embodiment, a photonic chip 36 may be auto aligned with an array 105 of couplers 104. This can be used as an independent module (without optical fiber waveguides) as shown in FIGS. 1(g) and 1(h). The module may be connected with an independent fiber array (not shown in FIGS. 1(g) and 1(h)).

In another embodiment, a fiber array 107 comprising fibers 22(a), 22(b) may be aligned with a coupler array 105 of couplers 104 in an optical module as shown in FIGS. 1(i) and 1(j). The optical module in FIGS. 1(i) and 1(j) can function as an independent tensed fiber array (without a photonic chip) for channeling light into or out of a photonic chip (not shown in FIGS. 1(i) and 1(j). Fiber arrays may alternatively include any number of fibers. These and other embodiments are included within the scope of embodiments of the invention.

II. Exemplary Fabrication Methods

A. Forming Si Substrate Crystal Direction Identification Marks

FIGS. 2(a)–2(h) show the first steps in a method for forming an optical module according to an embodiment of the invention. The process sequence shown in FIGS. 2(a)–2(b) is used to identify the [110] direction of a Si(100) substrate.

In FIG. 2(a), a silicon substrate 40 undergoes a thermal oxidation process to form a $SiO_2$ layer 62 on it. The resulting $SiO_2$ layer 62 on the substrate 40 is about a few tens to a few hundred nanometers thick.

In FIG. 2(b), a silicon nitride ($Si_3N_4$) layer 64 is formed on the $SiO_2$ layer 62. The $Si_3N_4$ layer 64 can be formed by a vapor deposition process such as a CVD (chemical vapor deposition) process. The $Si_3N_4$ layer 64 can be from a few tens to a few hundred nanometers thick. In this example, the $SiO_2$ layer 62 and the $Si_3N_4$ layer 64 will later become a KOH etch mask. Although $SiO_2$ and $Si_3N_4$ are described for purposes of illustration, it is understood that other materials could also be used.

In FIG. 2(c), a photoresist layer 66 is formed on the $Si_3N_4$ layer 64. A process such as spin coating can be used to deposit the photoresist layer 66. The photoresist layer 66 could comprise a negative or a positive photoresist.

In FIG. 2(d), a mask 70 is disposed above the photoresist layer 66. The mask 70 blocks some radiation (e.g., UV light) from reaching the photoresist layer 66 while allowing some radiation to pass. The photoresist layer 66 is thus irradiated with a pattern of radiation. In some embodiments, the irradiated portions of the photoresist layer 66 may be rendered soluble in an appropriate developer while portions that are not irradiated may be insoluble in the developer.

In FIG. 2(e), the photoresist layer is developed to form a patterned photoresist layer 72. A developer may be used to develop the irradiated photoresist layer 66. Photoresist developers are well known in the art. In FIG. 2(f), after the patterned photoresist layer 72 is formed, the patterned photoresist layer 72 is used as an etch mask for etching the $Si_3N_4$ layer 64. For example, in some embodiments, the $Si_3N_4$ layer 64 may be dry etched using, for instance, a RIE (reactive ion etch) process. After etching the $Si_3N_4$ layer 64, a buffered hydrofluoric (BHF) etch process may be used to etch the $SiO_2$ layer 62.

In FIG. 2(g), the patterned photoresist layer 72 is stripped using an appropriate stripper. Then, as shown in FIG. 2(h), the patterned $Si_3N_4$ layer 64 and $SiO_2$ layer 62 may be used as an etch mask for the Si substrate 40. A KOH based wet etching process may be used to etch the Si substrate 40 and form identifying marks 74 that are used to identify the [110] direction of an Si(100) substrate.

B. Forming Optical Fiber or Optical Element Positioning Grooves

FIGS. 3(a) to 3(i) show the process sequence for forming U-grooves for a fiber array on a substrate 40. This process sequence will also to a certain extent define the optical coupler and the photonic chip pocket region. The photonic chip pocket region may correspond to the chip mounting region on the Si substrate.

In FIG. 3(a), [110] identification marks 74 are present in the Si substrate 40. Then, in FIG. 3(b), a photoresist layer 76 is formed on the Si substrate 40 and on top of the $Si_3N_4$ layer 64. The photoresist layer 76 may be formed using a spin coating process.

In FIG. 3(c), after forming the photoresist layer 76, it is exposed to a pattern of radiation (e.g., UV light) formed by a mask 478. The identification marks 74 are used for mask alignment so that the U-groove line is in the same direction as the Si [110] crystalline direction. After irradiating the photoresist layer 76, it is developed as shown in FIG. 3(d) to form a photoresist pattern 78.

In FIG. 3(e), after forming the photoresist pattern 78, the $Si_3N_4$ layer 64 can be dry etched using a RIE etch process, and the $SiO_2$ layer 62 can be etched using, for example, BHF. After etching the $Si_3N_4$ layer 64 and the $SiO_2$ layer 62, the photoresist pattern 78 can be stripped as shown in FIG. 3(f).

In FIG. 3(g), U-grooves are formed in the silicon substrate 40 using, for example, a KOH etch process. As shown in FIGS. 3(h) and 3(i), the $Si_3N_4$ and $SiO_2$ layers 62, 64 are removed using appropriate etchants for these layers. FIG. 3(h) shows a lateral cross sectional view of a U-groove 80, while FIG. 3(i) shows a plurality of U-grooves 80 from a longitudinal view.

C. Forming a Coupler Structure and a Photonic Chip Pocket

FIGS. 4(a) to 4(i) show a process sequence that uses a third mask. Here, a glass film is deposited and photolithography and dry etching processes are used to define a coupler and the photonic chip pocket (with precision mechanical spacers). Thin film deposition techniques may also be used.

As shown in FIG. 4(a), a silicon substrate 40 with U-grooves for a fiber array is shown. Referring to FIG. 4(b), a light coupling optical film or medium such as a composite film 84 is then formed on the silicon substrate 40 with grooves. In some embodiments, the composite film 84 may be from about 10 to about 15 microns thick (or more or less than about 10 to about 15 microns).

The composite film 84 is preferably formed with a plurality of layers of materials that have different refractive indexes. Typically, the plural layers comprise at least one oxide material. The plurality of layers can comprise, for example, alternating layers of the following materials: $TiO_2/SiO_2$, $GeO_2/SiO_2$, $Si/SiO_2$, etc. Ion assisted deposition, sputtering, CVD, PECVD, sol-gel and other processes may be used to deposit such layers. In some embodiments, the composite film 84 may comprise over 100 layers of materials with alternating indexes of refraction. Eventually, a portion of the composite film 84 may form the optical coupler which may be a GRIN structure (gradient refractive index). Further details about the formation of the composite film 84 and optical coupler can be found in U.S. patent application Ser. No. 10/652,269, entitled "Varying Refractive Index Optical Medium Using At Least Two Materials With Thicknesses Less Than A Wavelength", filed concurrently herewith, which is incorporated by reference in its entirety.

After forming the composite film 84, a hard mask layer 86 including, for example, Ti/Ni, Ni/Cr, Cr, WSi, polysilicon, etc. can be formed on the composite film 84 as shown in FIG. 4(c). The pattern that is formed from the hard mask layer 86 can be used as an etch mask for the composite film 84.

After forming the hard mask layer 86, as shown in FIG. 4(d), a photoresist layer 88 is formed on it. A spin or spray coating process may be used to form the photoresist layer 88. As shown in FIG. 4(e), the photoresist layer 88 is irradiated through a mask 90. It can be exposed with UV light using a mask that is used to define a pocket region and a coupler. Alignment of the coupler pattern with the U-groove pattern is achieved using a standard mask aligner and properly designed alignment marks. The photoresist layer 88 is then developed to form a photoresist pattern 90 as shown in FIG. 4(f). In FIG. 4(g), the hard mask layer 86 is then dry etched using, for example, a RIE etch process. Then, the photoresist pattern 90 is stripped as shown in FIG. 4(h).

As shown in FIG. 4(i), after the photoresist pattern 90 is stripped, the composite film 86 is etched to create the optical coupler 104 and the pocket 102 for the photonic chip (not shown). In this step, very precise alignment between the U-grooves, optical couplers, and the photonic chip pocket is achieved using mask aligners during photolithography.

While the figures show an optical coupler being formed on a substrate using a particular process, it is understood that an optical coupler could be formed on a substrate in any suitable manner. In other embodiments, an optical coupler could be preformed and then placed on a substrate. For example, a ball-type optical coupler could be placed on a substrate using a pick-and-place process.

FIGS. 4(b) to 4(h) show the preparation of a patterned hard mask for dry etching the composite layer. An alternative way to do this used a standard lift off process. In a lift off process, a photoresist pattern can be created first and the hard mask layer is then deposited. Afterwards, the substrate is immersed in a solvent such as acetone to dissolve the photoresist and lift off the hard mask material that is on top of undeveloped photoresist. In this process, the photoresist pattern that is used will be a negative of the hard mask pattern produced.

D. Forming a Deep Trench Between the Groove and the Coupler

FIGS. 5(a)–5(f) illustrate a process sequence in which a deep trench is dry etched at the U-groove end region to eliminate the Si slope created by the KOH crystallographic wet etching process so that a flat tipped optical fiber can be pushed to be almost in contact with the large beam side of the optical coupler.

Referring to FIGS. 5(a) and 5(b), a thick photoresist layer 92 is formed on the Si substrate 40. In FIG. 5(c), the thick photoresist layer 92 is exposed with UV light passing through a mask 96. Again, alignment is used to insure that the area to be etched is aligned with the previously created patterns.

Figure 5:
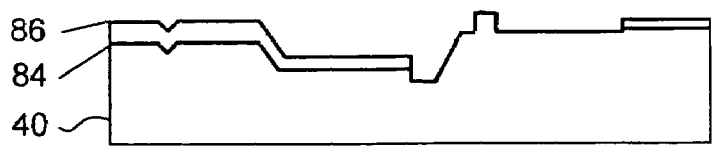
FIGS. 5(a)–5(f) show the steps used to form a deep trench to eliminate the silicon slope at the end of a U-groove that has been created during KOH crystallographic wet etching.
Figure 5:
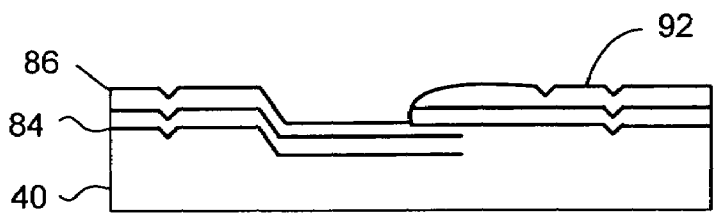
Figure 5:
Figure 5:
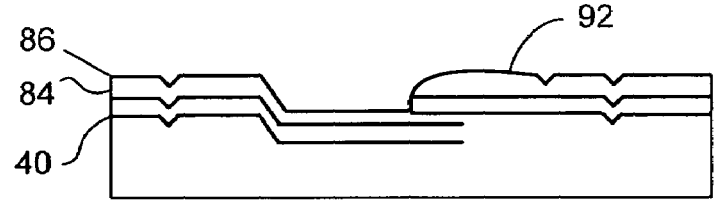
Figure 5:
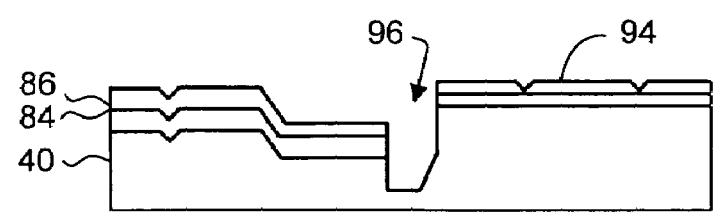
Figure 5:
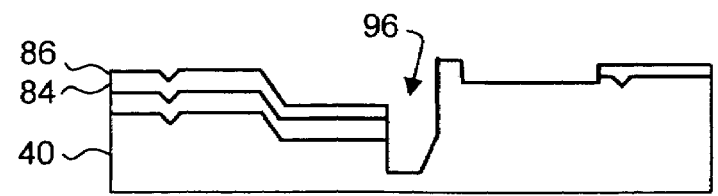
Figure 6:
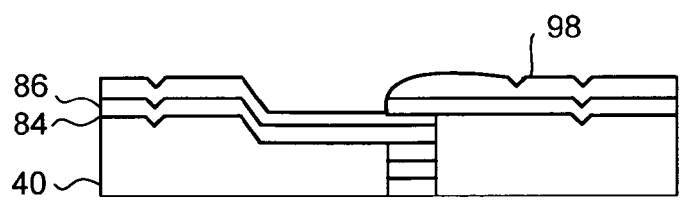
FIGS. 6(a)–6(f) show steps that are used to etch a hard dry etching mask and glass material, and to clean up the photonic chip pocket bottom surface through wet or dry etching.
Figure 6:
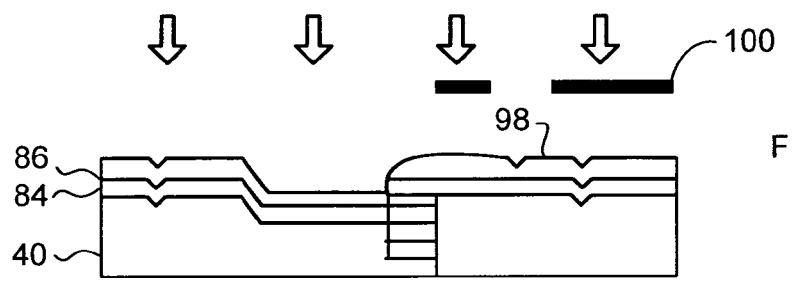
Figure 6:
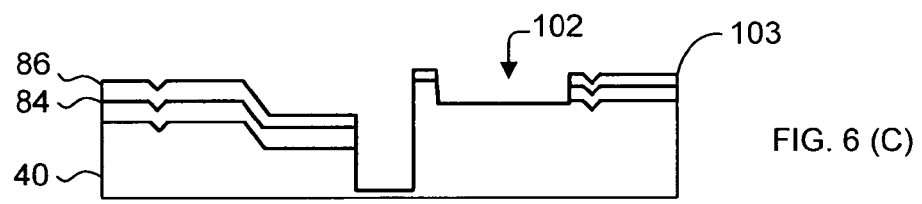
Figure 6:
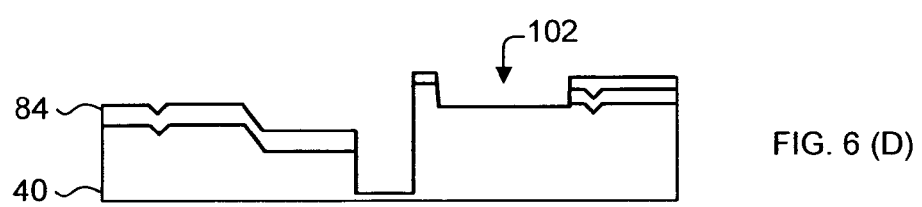
Figure 6:
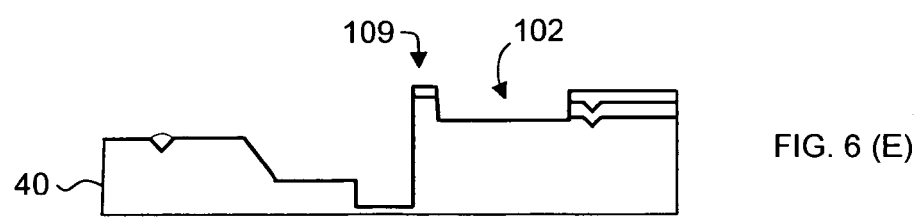
Figure 6:
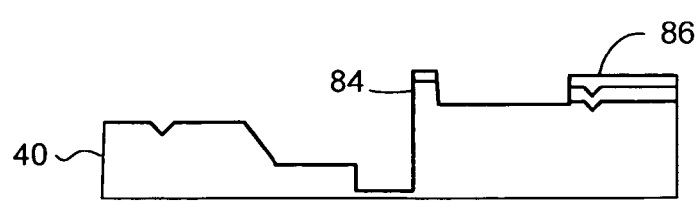
Figure 7:
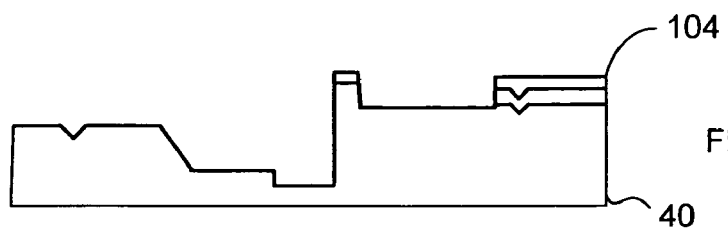
FIGS. 7(a)–7(f) show steps that are used to deposit a passivation layer and to deposit under bump metal (UBM) pads.
Figure 7:
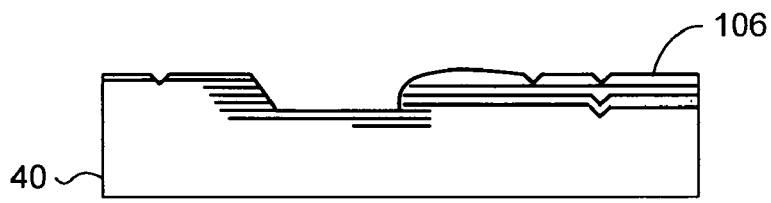
Figure 7:
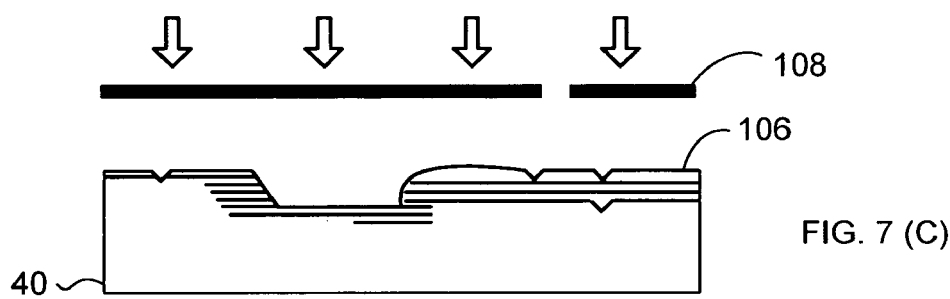
Figure 7:
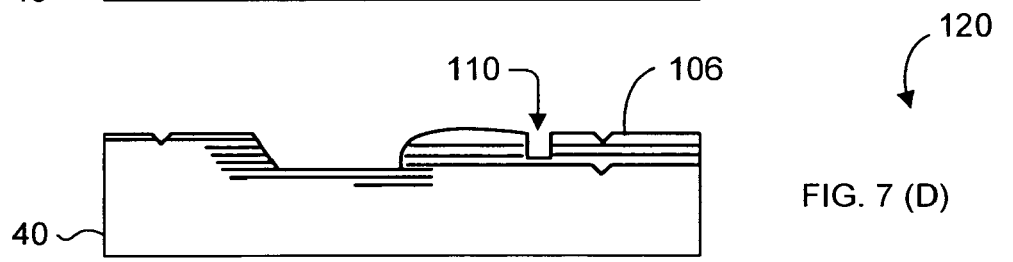
Figure 7:
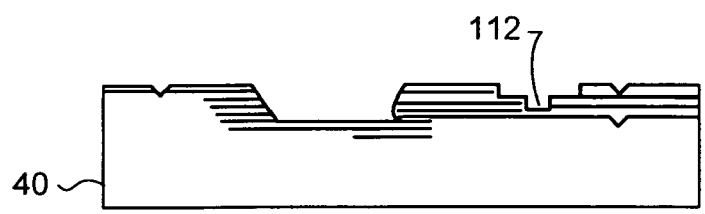
Figure 7:
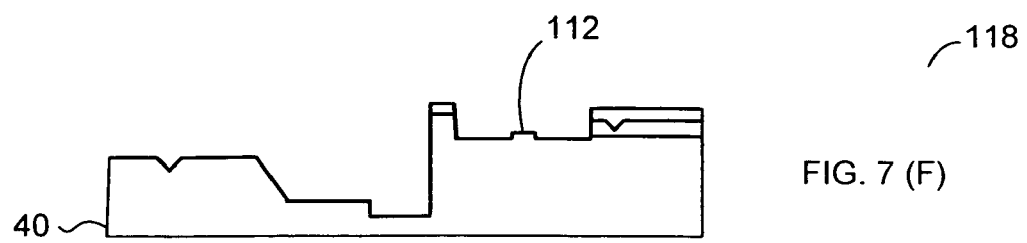

Referring to FIG. 5(d), the photoresist layer 92 is developed to form a photoresist pattern 94. Then, as shown in FIG. 5(e), a silicon deep etching process such as a Bosch Process can be performed to form a deep trench 96. Then, as shown in FIG. 5(1), the photoresist pattern 94 is stripped.

E. Removing a Dry Etch Hard Mask and Composite Film in the Groove and Pocket

FIGS. 6(a) to 6(f) show a process sequence of etching away unwanted hard dry etch mask material and composite film material. In this example, the cleaning of the bottom surface of an optical chip pocket through dry or wet etching is also shown. The silicon surface is revealed in this etching process. In other embodiments, the wet or dry etching can be continued to proceed to a certain depth inside the Si substrate. This can be done to create an appropriate depth for various solder bump height requirements.

In FIG. 6(a), a thick photoresist layer 98 is deposited on the substrate 40. A spin or spray coating process may be used to form the thick photoresist layer 98. As shown in FIG. 6(b), the thick photoresist layer 98 is then exposed using UV light that passes through a mask 100 and the photoresist layer 98 is then developed. The patterned photoresist layer 103 protects the coupler and the wall portion forming the photonic chip pocket region.

In FIGS. 6(c), 6(d) and 6(e), portions of the undeveloped photoresist 98 and the hard mask layer 86 are removed, for example, by a wet etch process. Then, portions of the composite film 84 are removed using a wet or dry etch process. The remaining composite film material in the pocket and also on the U-grooves is removed, forming pocket 102 and optical coupler 104. In other embodiments, the composite film in the grooves could remain in the final optical module. Then, as shown in FIG. 6(f), the photoresist pattern is removed by stripping.

F. Using a Natural Etch Stop as a Chip Alignment Mechanism

The natural etch stop interface between the coupler material (which is basically $SiO_2$ in some embodiments) and the Si substrate is useful in terms of defining the height or vertical positioning accuracy of a flipped photonic chip with respect to the optical coupler. This is especially true when the natural stop is used together with glass ball spacers of very precise dimensions (e.g., variation smaller than 0.1 µm).

Although many of the steps described above mention wet etching, wet etching is not necessary if the glass dry etching process used has very high selectivity so that the Si surface at the bottom of the pocket can be revealed. In this case, the glass film in the U-groove can either be etched off during the glass dry etching process or the glass film can be left there. In terms of lateral or horizontal auto alignment, flip chip bonding which can be combined with solder bump reflow, can be used and exemplary embodiments of these will be described below.

G. Creating a Solder Pad in the Pocket

FIGS. 7(a)–(f) illustrate a process sequence where a passivation layer is deposited. An under bump metal (UBM) solder pad is also formed inside of the pocket. This step involves the use of a photo mask that defines the solder pad. When a solder pad is deposited on the bottom surface inside the pocket, the passivation layer ensures that it will not be electrically connected with the Si substrate. This will ensure that when more than one electrical connection is needed from the flipped photonic chip to the outside world, there will be no electrical shorting between any two adjacent conducting paths. The material that can be used for passivation can vary. Examples of suitable materials include $Si_3N_4$ or $SiO_2$.

Referring to FIG. 7(a), a passivation layer 804 (such as $Si_3N_4$) is formed on the Si substrate 40. Then, as shown in FIG. 7(b), a thick photoresist layer 106 is formed on the Si substrate 40. As shown in FIG. 7(c), UV light passes through a solder pad photo mask 108 to irradiate the photoresist layer 106. The photoresist layer 106 is then developed as shown in FIG. 7(d). An opening 110 is formed in the pocket region where a solder pad is to be formed. As shown in FIG. 7(e), the under bump metal (UBM) solder pad 112 is formed. A plating process or a vapor deposition process could be used to form the under bump metal solder pad 112. As shown in FIG. 7(f), the photoresist layer 106 is removed to lift off any metal on top. This leaves the under bump metal solder pad 112.

H. Forming a Solder Bump on Top of a Solder Pad in the Pocket

Figure 8:
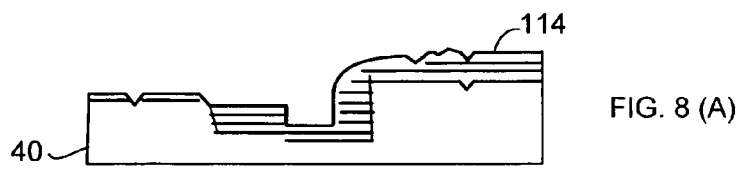
FIGS. 8(a)–8(c), in combination with one set of FIGS. 8(d)-1 and 8(d)-2, and FIGS. 8(e)-1, and 8(e)-2 show ways to create solder bumps. The first way is to create solder bumps through evaporation. The second way is to create solder bumps using electroplating.
FIGS. 8(f)–8(g) show solder bumps before and after reflow.
Figure 8:
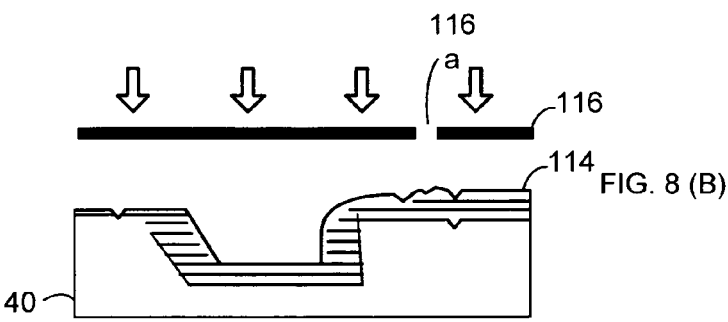
Figure 8:
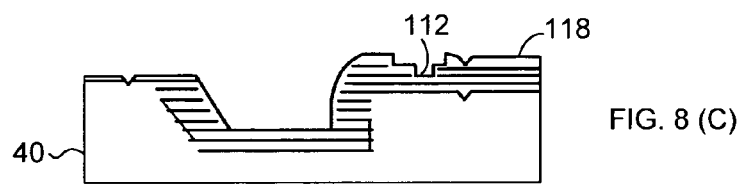
Figure 8:
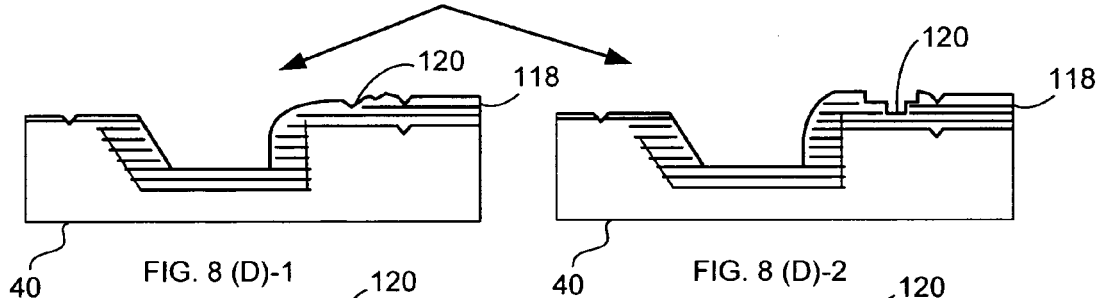
Figure 8:
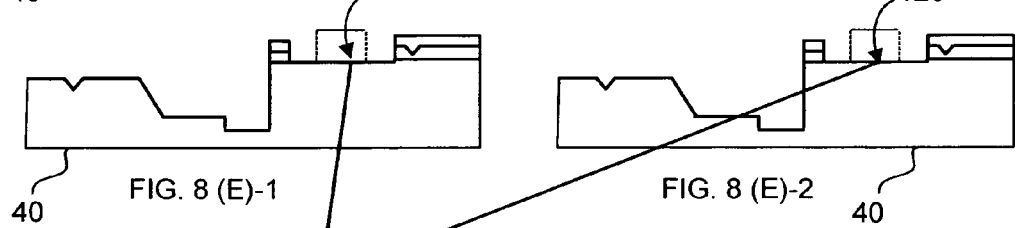
Figure 8:
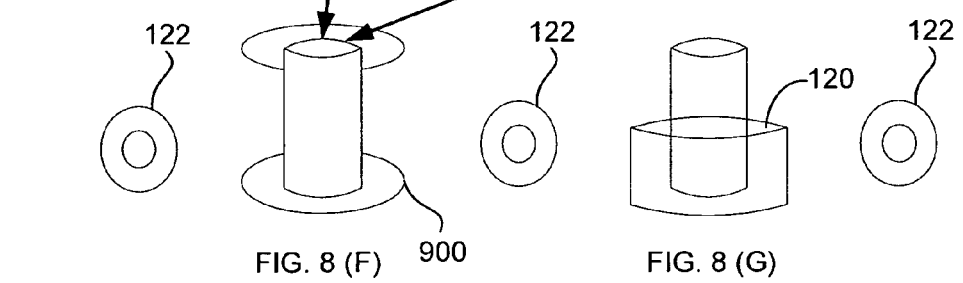

FIGS. 8(a) to 8(c), 8(d)-(1), 8(d)-(2), 8(e)-1, and 8(e)-2 show process sequences where solder bumps are either evaporated or electroplated. As shown in FIG. 8(a), a thick photoresist layer 114 is deposited on the Si substrate 40. Then, as shown in FIG. 8(b), UV light irradiates the photoresist layer 114 using the solder bump photo mask 116. Then, the photoresist layer 114 is developed leaving developed photoresist 118 with an aperture 116a where the solder pad 112 is desired.

Figure 2:
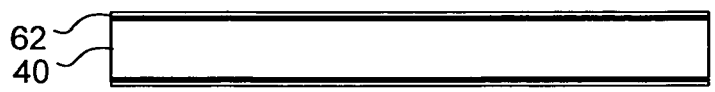
FIGS. 2(a)–2(h) show cross sections of a silicon (100) substrate as it is being processed to identify the [110] direction of the silicon (100) substrate.
Figure 2:
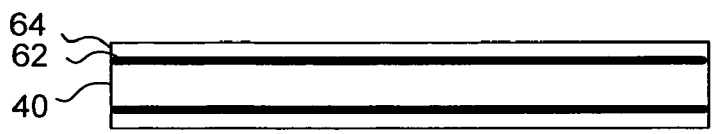
Figure 2:
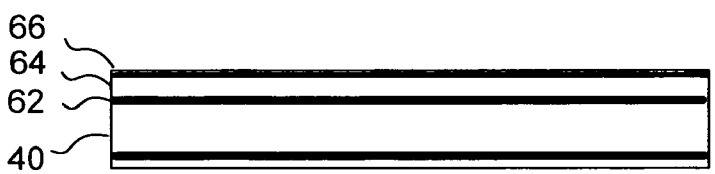
Figure 2:
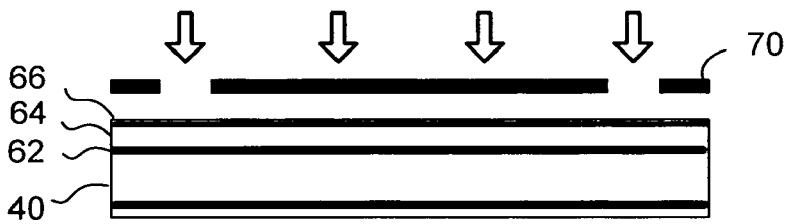
Figure 2:
Figure 2:
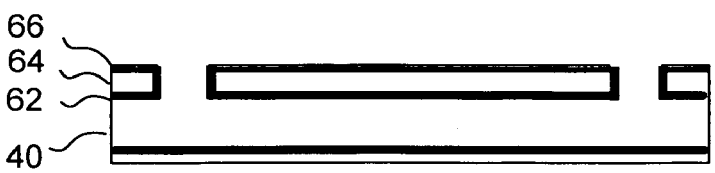
Figure 2:
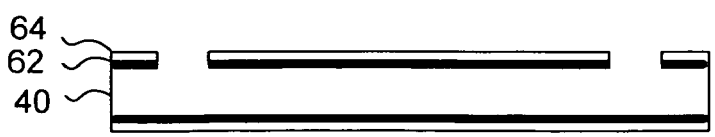
Figure 2:
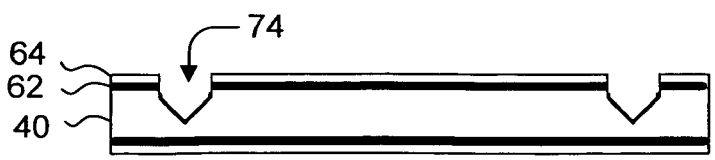
Figure 3:
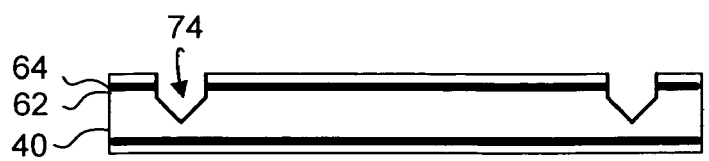
FIGS. 3(a)–3(i) show cross sections of steps used to form grooves in a silicon substrate. The process steps used to form a region for an optical coupler and photonic chip pocket are shown.
Figure 3:
Figure 3:
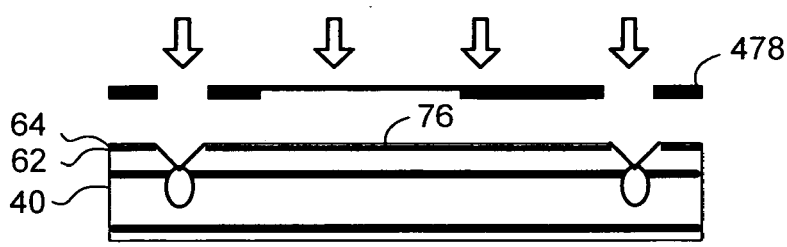
Figure 3:
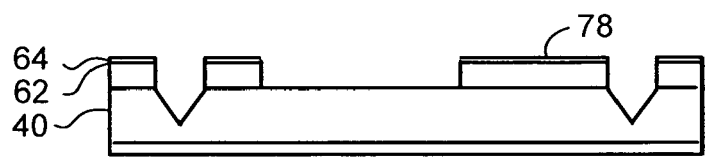
Figure 3:
Figure 3:
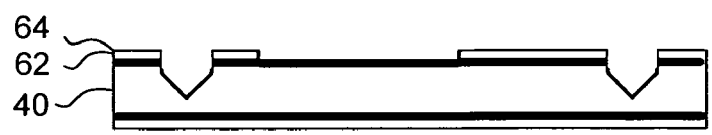
Figure 3:
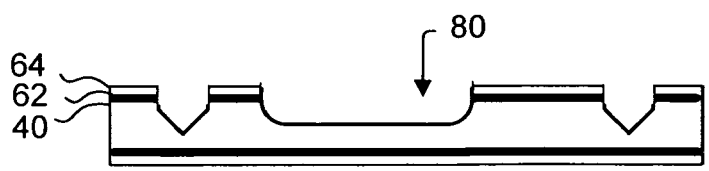
Figure 3:
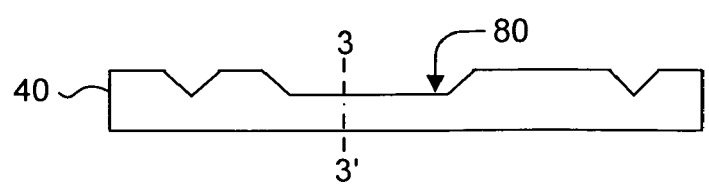
Figure 3:
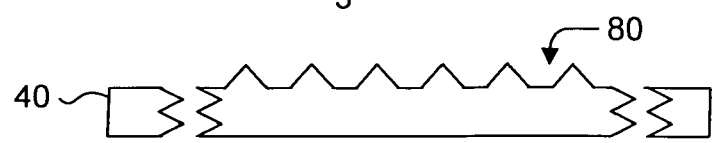

Solder may then be deposited on the solder pad 112 through an evaporation or plating process. As shown in FIGS. 8(d)-(1) and 8(e)-(1), a solder bump 120 may be electroplated on the solder pad. In an alternative embodiment, the solder bump 120 may be vapor deposited and then portions of the vapor deposited layer may be lifted off of the Si substrate 40 as a result of the resist stripping process. This alternative process is shown in FIGS. 8(d)-(2) and 8(e)-2. Then the photoresist layer 118 is removed, as shown in FIGS. 8(d)-2 and 8(e)-2. If the solder bump is formed by an evaporation process, an undercut photoresist profile is preferred for good lift off. Processes using a double layer photoresist, a lift off layer (LOL), or chlorobenzene or toluene treatments could be used to achieve the required profile. Such techniques are known to those of skill in the semiconductor art.

Referring to FIGS. 8(f)–8(g), the solder pad area as well as the height of the solder bump 120, which will determine the solder bump volume, can be properly selected. The selection criteria is that the total volume of the initial solder can be about equal to or slightly less than the volume of the cylinder formed by the top and bottom solder pad after the solder bump is reflowed (see 120 in FIG. 8(g)) to completely wet the two solder pads at opposite ends of the re flowed solder bump. The photonic chip is pulled down by the molten solder bump's surface tension but the downward movement is stopped by the precision glass ball spacers 122. Suitable glass ball spacers are commercially available from Sekisui Chemical Co. Ltd. under the tradename "Micropearl."

It is noted that the amount of solder for the solder bump 120 can be selected using any suitable process. For example, it is possible to select the volume of solder using the area of the solder pad 900 that the solder will be deposited on and the height of an adjacent spacer 122. As shown in FIG. 8(f), the volume of the solder that is deposited can be substantially equal to the volume of a cylinder defined by the area of the pad 900 and the height of the spacer 122.

It should also be noted that as an alternative, the solder bump can be initially created on the photonic chip in similar ways as described here instead of being solely created in the pocket. In addition, solder bumps can also be created both in the pocket and also on the photonic chip to assist the connection of the photonic chip inside the pocket when the solder material is reflowed. Solder to solder attachment is generally more straightforward than solder to metal pad attachment.

Figure 9:
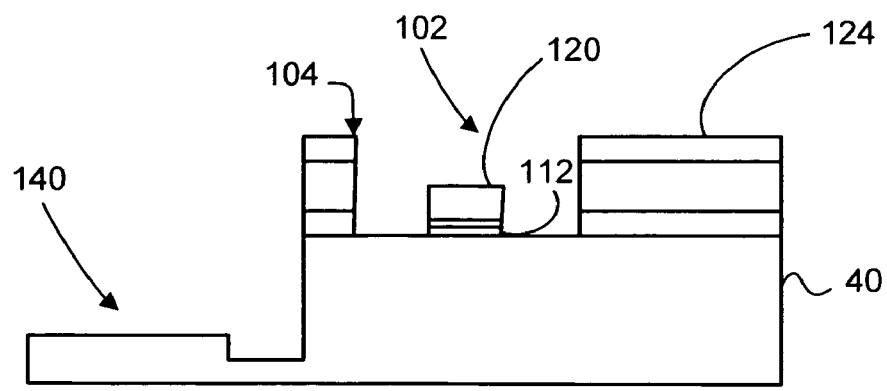
FIG. 9 shows a close up view of the optical coupler on the substrate. This can represent one module after dicing and/or cleaving.

FIG. 9 shows a side view of a support structure 140 for an optical beam transformer module, including optical coupler 104 on a silicon substrate 40. Together, the optical coupler 104 and a wall portion 124 define a chip mounting region as well as a photonic chip pocket 102. A solder pad 112, and a solder bump 120 lie in the pocket and on the silicon substrate 40. The structure shown in FIG. 9 could represent one module containing, for example, 8 U-grooves and 8 optical couplers after dicing and/or cleaving a larger silicon substrate.

I. Placing a Photonic Chip on Height Determining Spacers

Figure 10:
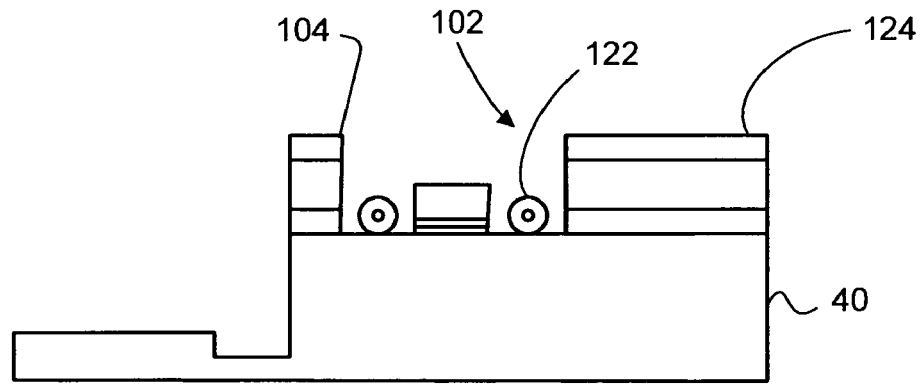
FIG. 10 shows the step of placing precision glass ball spacers (cylindrical or spherical shapes) in the photonic chip pocket using, for example, spraying, screen printing or other processes.

FIG. 10 shows precision glass ball spacers 122 in a photonic chip pocket formed in part by a silicon surface. The spacers 122 may be placed on the silicon substrate 40 using, for example, micro tweezers to pick and place, spraying, screen printing or any other suitable process. The use of very precise diameter glass ball spacers 122 together with the use of a natural etch stop at the silicon interface is preferred in embodiments of the invention. The photonic chip (not shown) and the optical coupler 104 are precisely and accurately aligned using the spacers 122. In addition, these glass balls 122 can roll and hence the friction force associated with the movement of the photonic chip will be less as compared with an etched rigid spacer structure. The ball spacer also has a very smooth spherical surface and hence a very small contact area with the photonic chip, and will therefore have minimum friction even if the ball spacer does not roll. As a result, the self movement and self alignment (under the surface tension action of re flowed solder alloys) of the photonic chip will be enhanced after the solder bump 120 is reflowed. It should be noted that the height controlling self stopping spacers do not need to be ball spacers. Other structures can be used. For example, micro-rods with precise diameters can be used. In addition, pillar structures can be etched in the pocket to act as height control spacers, as disclosed in our co-pending application entitled, "Photonic Chip Mounting in a Recess for Waveguide Alignment and Connection."

J. Flip Chip Bonding a Photonic Chip

Figure 11:
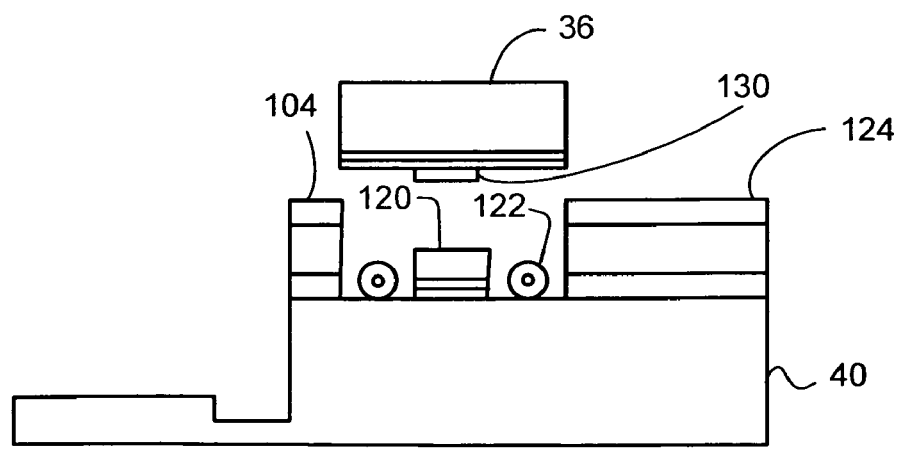
FIG. 11 shows the step of placing a photonic chip in a pocket. A flip chip bonding process or another suitable pick/place process could be used.

FIG. 11 shows a flip chip bonding process where a photonic chip 36 with a bonding pad 130 is positioned over a pocket 102 formed by the optical coupler 104 and an opposite wall portion 124. A flip chip bonder or a robotic arm that is lowered down into the pocket 102 may be used to mount the photonic chip 36. During this step, heat is applied to slightly melt the solder alloy of the solder bump 120 to preliminarily adhere the solder pad 130 on the photonic chip 36 with the solder bump 120. It should be noted that a silicon substrate need not be diced into small pieces before this step. In fact, photonic chips may be mounted and put in each pocket before the substrate is diced.

K. Solder Reflow and Photonic Chip Auto Alignment, FIGS. 12-14

Figure 12:
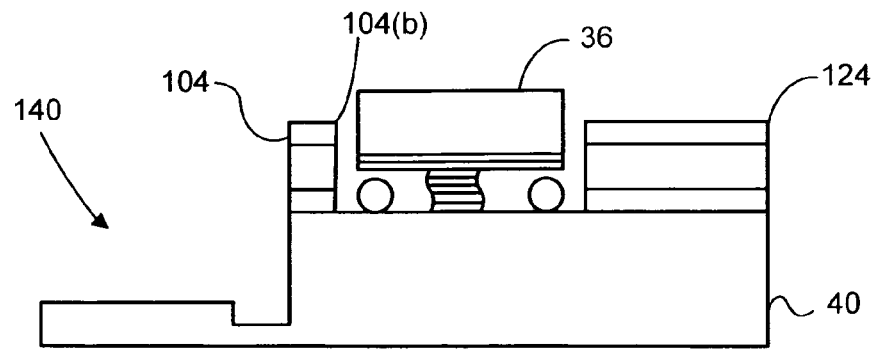
FIG. 12 shows a step in which a solder material is reflowed to achieve self alignment by taking advantage of the surface tension of the solder material and spacers.

FIG. 12 shows a step in which the solder material is reflowed to bond photonic chip 36 to solder pad 112 of support structure 140 including silicone substrate 40, the photonic chip 36 meant for precision placement between coupler 104 and wall portion 124. As a result of the reflow, self alignment can be achieved by taking advantage of surface tension of the solder material when it melts. The proper volume range of the solder bump, the precision glass ball spacer, the precision mechanical stopper and any intentional offset between the solder pad pairs will all help to align the photonic chip with the coupler structure. The proper selection of the solder bump volume and the intentional offset between the location of the bottom solder pad and that of the top solder pad on the photonic chip will generate a force that can pull the photonic chip downward as well as sideways to enable the photonic chip to be self aligned.

L. Under Filling and/or Encapsulation

Figure 13:
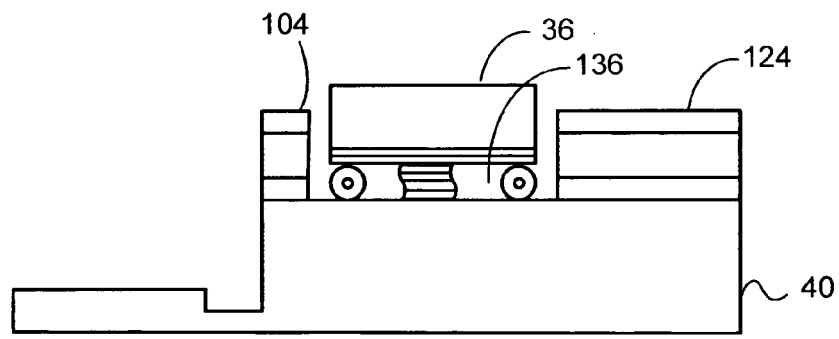
FIG. 13 shows a step of depositing an underfill material between the photonic chip and the substrate to enhance the mechanical strength of the photonic chip attachment and to protect solder connections.

FIG. 13 illustrates a step where an underfill and/or encapsulation material is deposited between the silicon substrate 40 and the photonic chip 36. Suitable underfill materials 136 and processes for depositing underfill materials are known in the art. This enhances the mechanical strength of the optical assembly and protects solder connections.

M. Auto Alignment of Optical Fiber or Optical Element

Figure 14:
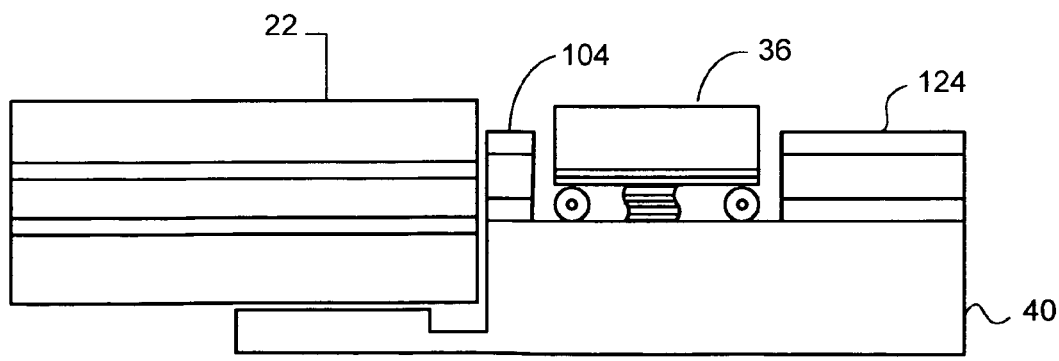
FIG. 14 illustrates the step of placing and fixing an optical fiber inside of a precision U-groove.

FIG. 14 shows the last step which is to place and fix optical fibers 22 or fiber arrays inside the precision U-grooves. As noted above, the dicing of the whole substrate can be done before this step. In this optical fiber fixing process, one can use epoxy, or laser welding or mechanical fixing methods to fix a fiber in a groove. A refractive index matching fluid or material can be introduced in the gap between the end of the fiber 22 and the large beam side of the coupler 104. It should be understood that instead of an optical fiber, a miniaturized optical component can be fixed in basically similar way as in the case of optical fiber, although the groove for an optical element may be different from that for an optical fiber.

N. Exemplary Alternative Fabrication and Auto Alignment Methods

There are ways to improve the processing and optimize the performance of the optical assembly. For example, anti reflection coatings can be deposited on the small beam side end face 104(b) of the coupler 104 at, for example, the process step in FIG. 5(f) or in FIG. 6(f).

Figure 15:
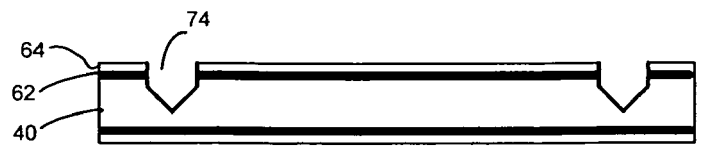
FIGS. 15(a)–15(p) show an alternative way to fabricate a U-groove and an optical coupler.
Figure 15:
Figure 15:
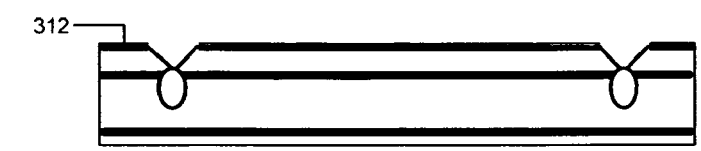
Figure 15:
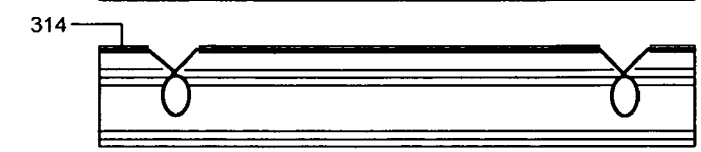
Figure 15:
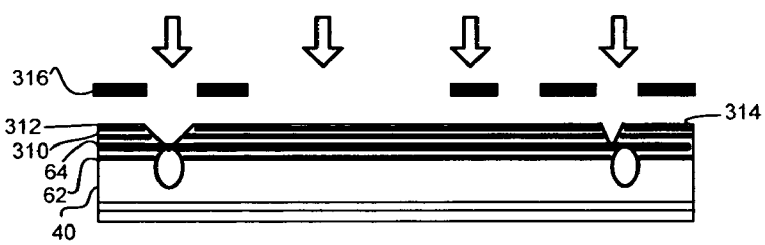
Figure 15:
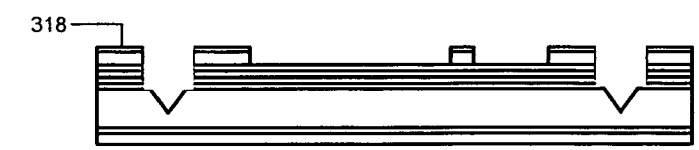
Figure 15:
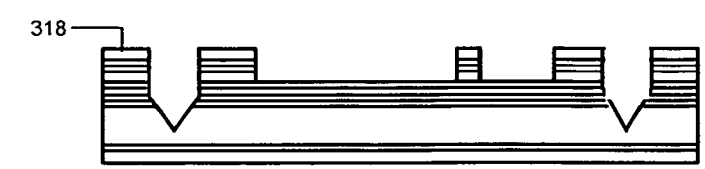
Figure 15:
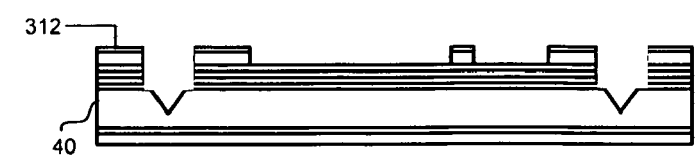
Figure 15:
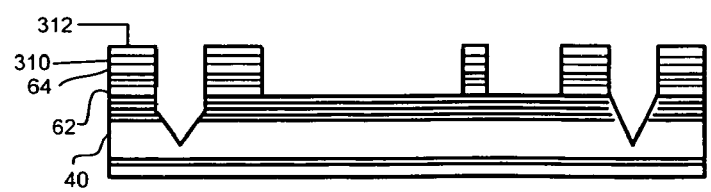
Figure 15:
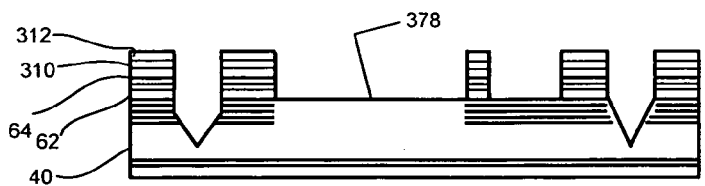
Figure 15:
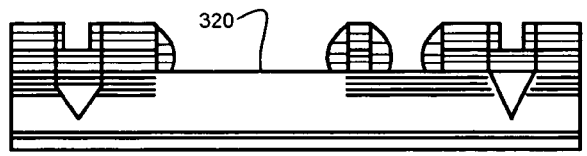
Figure 15:
Figure 15:
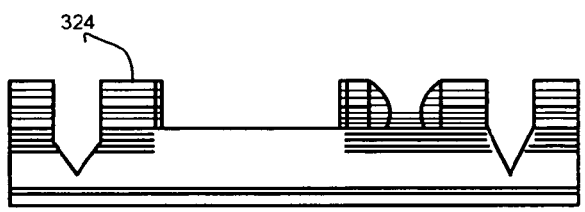
Figure 15:
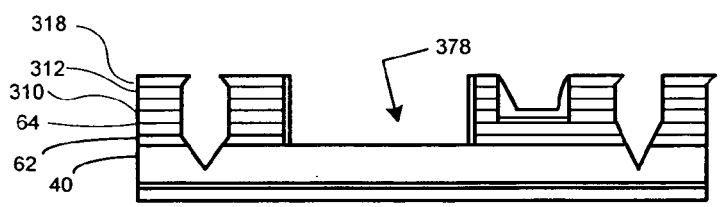
Figure 15:
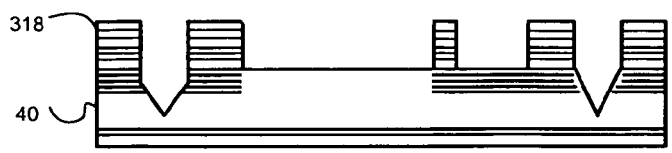
Figure 15:
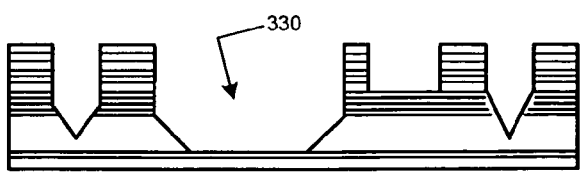

There are also other ways to produce an optical assembly according to embodiments of the invention. An alternative fabrication method can be described with reference to FIGS. 15(a)–15(p). The method shown in these Figures changes the sequence of fabricating the U-grooves and the optical coupler. In this case, the optical coupler is fabricated before forming the U-groove. After both the optical coupler and the U-groove are fabricated, the remaining steps in the method can be similar to what has been described above.

As shown in FIG. 15(a), a Si substrate with [110] identification marks 74 is produced. The steps shown in FIGS. 2(a)–2(h) and described with reference to these Figures may be used. Referring to FIG. 15(b), a composite film 310 is deposited on the $SiO_2$ layer 62 and the $Si_3N_4$ layer 64. The composite film 310 may be similar or different to the composite film 84 described with reference to FIG. 4(b).

Then, as shown in FIG. 15(c), a hard mask 312 is formed on the composite film 310. The hard mask 312 may be formed in the same or different manner or may have the same or different materials as the hard mask 86 shown in FIG. 4(c) and described with reference to this Figure.

Referring to FIGS. 15(d)–15(f), after depositing the hard mask 312, a photoresist layer 314 is formed on the hard mask 312. It is then exposed (using a mask 316), and then developed to form a photoresist pattern 318. Exposure can occur with UV light using a photo mask 316 that defines the U-grooves, optical couplers and chip mounting region (and also the chip pocket).

Referring to FIG. 15(g), after forming the photoresist pattern 318, the hard mask 312 is etched using a dry etching process. As shown in FIG. 15(h), the photoresist pattern 318 is then stripped. After stripping the photoresist pattern 318 the composite film 310 is then etched as in FIG. 15(i). A dry etch process may be used to etch the composite film 310. Referring to FIG. 15(j), a sidewall protection material 378 is deposited on the Si substrate 40 as well as the sidewall of the coupler. The sidewall protection material 378 may be deposited using a process such as CVD, PECVD, sputtering, etc.

Referring to FIGS. 15(k)–15(m), after depositing the sidewall protection material 378, a photoresist layer 320 is formed on the sidewall protection material 378. It is then exposed using a photo mask 322, and is subsequently developed to form a photoresist pattern 324. The photoresist layer 320 may be formed using spin or spray coating. Exposure with UV light defines the V-groove region in this example, but does not necessarily define the chip mounting region (or the corresponding chip pocket) as the chip pocket has already been formed.

Referring to FIGS. 15(n)–15(o), after forming the photoresist pattern 324, the sidewall protection material 378 is etched where the U-groove is to be formed. This region is exposed through the photoresist pattern 324. After etching the sidewall protection material 378, the photoresist pattern 324 is stripped. Then, as shown in FIG. 15(p), a U-groove 330 is formed using, for example, a KOH or TMAH (tetra methyl ammonium hydroxide) based solution.

In the embodiment produced using the process sequence shown in FIGS. 15(a)–15(p), the thermal oxide layer and the $Si_3N_4$ layer initially deposited on the Si substrate (for the purpose of identifying the crystalline [110] direction) are not removed. The coupler composite film is then grown on top of these two layers. However, this is not absolutely necessary. In fact, these two layers (i.e., the thermal oxide and the $Si_3N_4$ layers) can be removed before the coupler composite film 310 is deposited. A layer of other material, such as metal (Al, Cr, Ti, etc.), could be introduced to increase the selectivity during the composite film dry etching process so that etching will stop exactly at this newly introduced layer. This layer could be an intentional etch stop layer. Etching may take place through the coupler composite film and with the etching stopping at this intentional etch stop layer. This can also avoid degrading the silicon surface after exposing it to a plasma etch process, which may produce a surface roughness in the Si substrate 40 during the U-groove etching process. The metal layer, however, could be selectively removed before U-groove etching using a wet etching process.

When fabricating U-grooves after the dry etching the coupler, the side wall protection material 378 protects the side walls of the optical coupler. KOH or TMAH may attack the side wall surfaces of the optical coupler. For the sidewall protection material, a nitride material such as $Si_3N_4$ is suitable, since it has a low etch rate in a KOH based etchant. As an alternative, photosensitive BCB (benzocyclobutene) or polyimide could be used as the sidewall protection material. BCB has good resistivity to KOH etching and thus can serve as a mask for a subsequent U-groove etch process.

After performing the step shown in FIG. 15(p), the same process sequence that is described with reference to FIGS. 7(a)–7(f), 8(a)–8(g), and 9–14 may be performed. Alternatively, a different process sequence could be performed after the step shown in FIG. 15(p).

III. Other Alternative Lateral or Horizontal Auto Alignment Approaches

As noted above, in embodiments of the invention, a photonic chip is mounted on a chip mounting region and in a chip pocket on a substrate assembly. Due to the limitation in the cleaving accuracy of the photonic chip, which is usually a few microns, the size of the photonic chip cannot be generally cleaved to a precision of a submicron. To overcome this problem, photolithography, combined with dry or wet etching, can be used to create an island structure with an abutment wall in the photonic chip.

Figure 16:
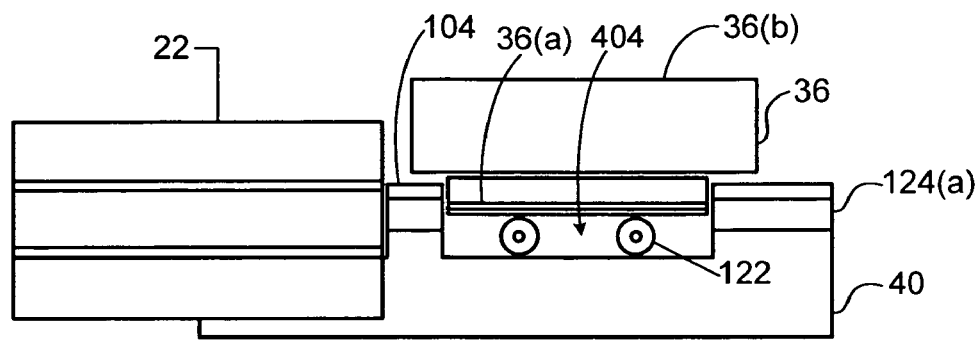
FIGS. 16(a)–16(b) show cross sections of optical module embodiments where the photonic chip has an island forming an abutment wall.
Figure 16:
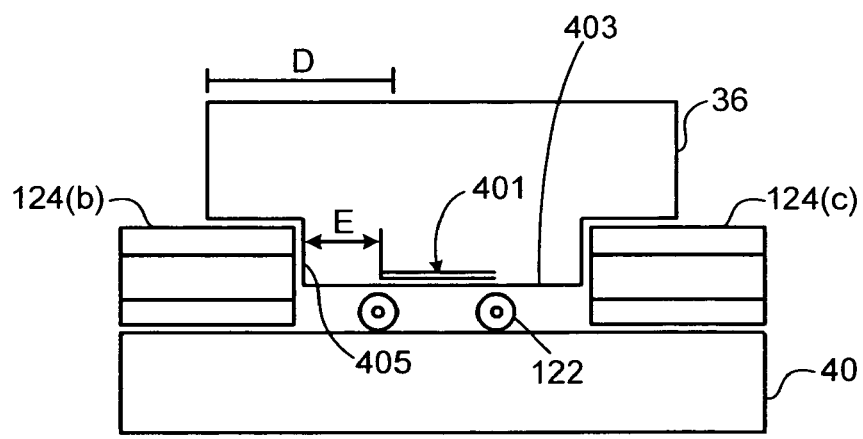

FIGS. 16(a)–16(b) show an optical assembly that includes a photonic chip 36 on a substrate 40. Wall portions 124(a), 124(b), 124(c) and a coupler 104 are on the substrate 40 and form a pocket 404 for the phonic chip 36. An optical fiber 22 is in a U-groove formed in the substrate 40 and extends toward the photonic chip 36. Light in the optical fiber 22 can pass to or from the photonic chip 36 through the coupler 104. In this example, the photonic chip 36 includes a first surface 36(a) proximate to the substrate 40. First surface 36(a) includes an island 403 with an abutment wall 405. A second opposite surface 36(b) is distal to the substrate 40. The abutment wall 405 abuts against the wall portion 124(b) so that the light receiving or transmitting region 401 of the photonic chip 36 is properly aligned with the coupler 104. In this example, the abutment wall 405 is generally vertically oriented, and only one island 403 is present. Also, as shown, the island 403 is insertable within pocket 404, while another portion of the photonic chip 36 is outside of pocket 404.

The distance from the abutment wall of the island to the light receiving or transmitting region 401 can be precisely determined through photolithography. For example, the distance E in FIG. 16(b) can be accurately determined using photolithography, while the distance D is dependent upon the photonic chip dicing process, which has a greater uncertainty.

When using an island, the solder metal pad on the photonic chip can be designed to have a slight offset with respect to the solder metal pad on the bottom surface of the pocket. As a result, in the reflow process, the photonic chip can self align to move to either one side or one corner of the chip mounting pocket. Also, since the dimensions of the island can be precisely and accurately defined by photolithography, the photonic chip can be cooperatively structured to match the dimensions of the pocket. This can ensure proper alignment of the photonic chip in the optical module.

Figure 17A:
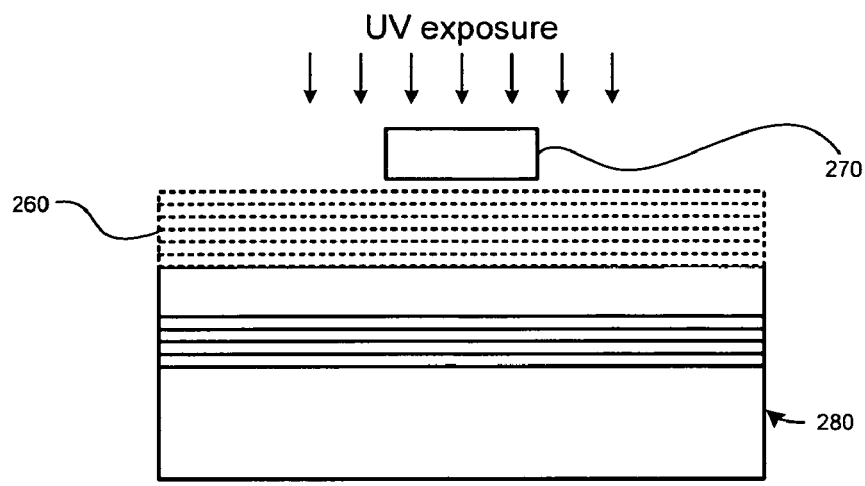
FIGS. 17(a)–17(c) show cross sections of a photonic chip as an island is being formed in it.
Figure 17B:
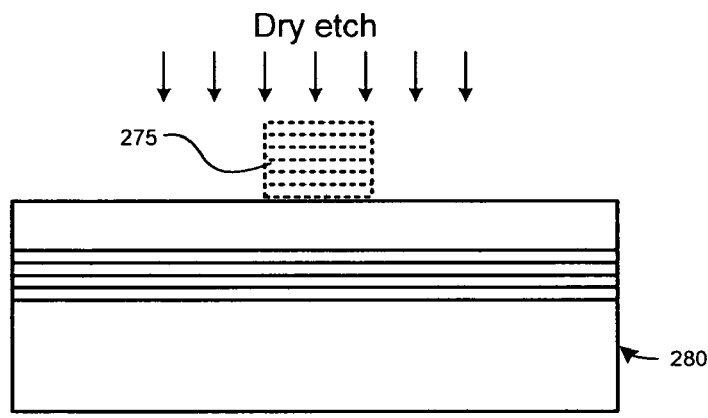
Figure 17C:
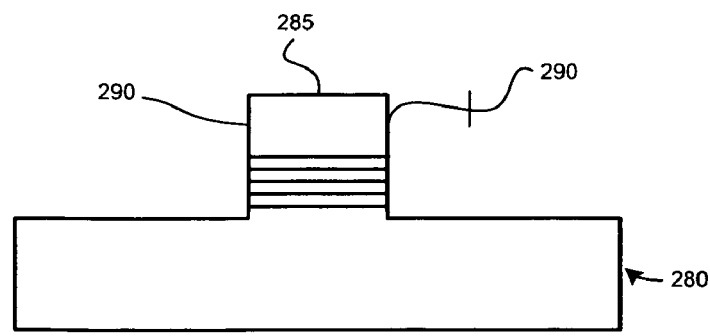

An exemplary process for forming an island in a photonic chip is shown in FIGS. 17(a)–17(c). Referring to FIG. 17(a), a patterned photoresist layer 270 is placed on a hard mask material 260 on a photonic chip 280. Then, a patterned hard mask layer 275 is formed as shown in FIG. 17(b). After forming the patterned hard mask layer 275, the photonic chip 280 is dry etched to a predetermine depth. As a result, as shown in FIG. 17(c), an island 285 with abutment walls 290 is formed. In this example, the abutment walls 290 are generally vertical.

In some embodiments, multiple islands can be used to form pillar type structures that can help to align the chip to the substrate 40. These islands may interface with spacers formed by photolithography. These photolithographically defined spacers can be formed on the substrate 40. These embodiments are discussed in co-pending U.S. Pat. App. 10/310,604, entitled. "Photonic Chip Mounting In a Recess for Waveguide Alignment and Connection," which is incorporated by reference in its entirety. It is noted that the abutment wall of the island and the sidewalls of the chip mounting pocket do not have to be vertical, but could be inclined.

It is understood that various alternatives to the embodiments of the invention described herein may be employed in practicing the invention. It is the intention of the inventors that any methods and structures within the scope of these claims and their equivalents should also be covered. Moreover, one or more features of any embodiment of the invention may be combined with any one or more features of any other embodiment of the invention without departing from the scope of the invention. For example, although photonic chips with islands are not specifically shown in FIGS. 1–15, it is understood that photonic chips with islands could be used in any of the specifically described embodiments shown and described with respect to FIGS. 1–15.

What is claimed is:

1. An optical module comprising:
   (a) a substrate assembly including
       (i) a photonic chip mounting region;
       (ii) a pocket at least partially defined by the photonic chip mounting region and a wall portion, and
       (iii) a groove extending towards the photonic chip mounting region;
   (b) a waveguide disposed within the groove;
   (c) a photonic chip comprising an island having an abutment wall, the photonic chip being above the chip mounting region, wherein the abutment wall contacts the wall portion; and
   (d) a plurality of spacers having predetermined heights for placement of the phontonic chip, wherein the photonic chip is arranged in a self-aligning position within the pocket, and coupled with the plurality of spacers and the wall portion; and
   (e) an optical coupler between the photonic chip and the waveguide.

2. The optical module of claim 1 wherein the photonic chip has only one island, and wherein solder is used to link the photonic chip and the substrate.

3. The optical module of claim 1 wherein the photonic chip has a first solder pad and wherein the substrate assembly has a second solder pad on the mounting region, wherein the first and second solder pads are positioned so that the abutment wall and the at least one wall portion contact each other after the solder is reflowed between the first and second solder pads.

4. A method for making an optical assembly, the method comprising:
   (a) forming a photonic chip with an island having an abutment wall;
   (b) forming a plurality of spacers having predetermined heights for placement of the photonic chip, wherein the photonic chip is arranged in a self-aligning position within the pocket, and coupled with the plurality of spacers and the wall portion;
   (c) inserting the island of the photonic chip into a pocket in a substrate assembly, wherein the pocket is at least partially defined by a wall portion and a photonic chip mounting region on the substrate, wherein the photonic chip contacts solder on the chip mounting region; and
   (d) reflowing the solder, wherein during reflow, the abutment wall contacts the wall portion.

5. The method of claim 4 further comprising forming an optical coupler on the substrate.

6. The method of claim 4 further comprising:
   forming an optical coupler on the substrate;
   forming a groove in the substrate; and
   placing an optical fiber in the groove.

7. An optical module comprising:
   (a) a substrate assembly including
       (i) a photonic chip mounting region defined by at least one wall portion,
       (ii) a first groove extending towards the photonic chip mounting region, and
       (iii) a second groove extending towards the photonic chip mounting region;
   (b) a first waveguide disposed within the first groove and a second waveguide in the second groove;
   (c) a photonic chip mounted on the photonic chip mounting region, wherein the first and second waveguides are at opposite sides of the photonic chip;
   (d) a first optical coupler between the photonic chip and the first waveguide; and
   (e) a second optical coupler between the photonic chip and the second waveguide, wherein that the wall portion forms a self-aligning structure for the photonic chip such that the photonic chip is arranged with in the wall portion at predetermined distances relative to the optical coupler.

8. The optical module of claim 7 wherein the first and second optical couplers each include a plurality of materials having different indices of refraction.

9. The optical module of claim 7 wherein the first and second optical couplers are included in the substrate assembly.

* * * * *